United States Patent [19]

Taciuk

[11] 4,180,455
[45] Dec. 25, 1979

[54] PROCESS FOR THERMAL CRACKING A HEAVY HYDROCARBON

[75] Inventor: William Taciuk, Calgary, Canada

[73] Assignee: Alberta Oil Sands Technology and Research Authority, Edmonton, Canada

[21] Appl. No.: 864,087

[22] Filed: Dec. 23, 1977

Related U.S. Application Data

[62] Division of Ser. No. 828,119, Sep. 26, 1977.

[51] Int. Cl.² .............................................. C10G 9/20
[52] U.S. Cl. ..................................... 208/126; 208/176
[58] Field of Search ............................... 208/126, 176

[56] References Cited

U.S. PATENT DOCUMENTS

| | | | |
|---|---|---|---|
| 1,450,327 | 4/1923 | Smith | 208/126 |
| 1,940,955 | 12/1933 | Laird | 208/126 |
| 3,481,720 | 12/1969 | Bennett | 48/89 |

*Primary Examiner*—Herbert Levine
*Attorney, Agent, or Firm*—Ernest Peter Johnson

[57] ABSTRACT

There is provided an apparatus comprising rotating inner and outer concentric tubes. The inner tube provides a vapor zone and the annular space between the tubes provides a combustion zone. Hot particulate solids, such as sand, are advanced along an endless path through the vapor zone, back through the combustion zone and back into the vapor zone. In the vapor zone, oil is sprayed on the hot solids. The mixture is mixed and cascaded to obtain heat transfer from the solids to the oil, thereby generating hydrocarbon vapors and coke deposition on the solids. The vapors are removed by suction from the vapor zone. The coked solids are transferred into the combustion zone and cascaded and lifted and dropped therein to mix with added oxygen. Coke is burned to heat the solids which are then returned to the vapor zone. The vapors generated in the combustion zone are removed by suction. Segregation of the atmospheres in the two zones is achieved by a combination of maintaining equal pressures in the zones and using the solids, being transferred from one zone to the other, to block gas flow.

1 Claim, 21 Drawing Figures

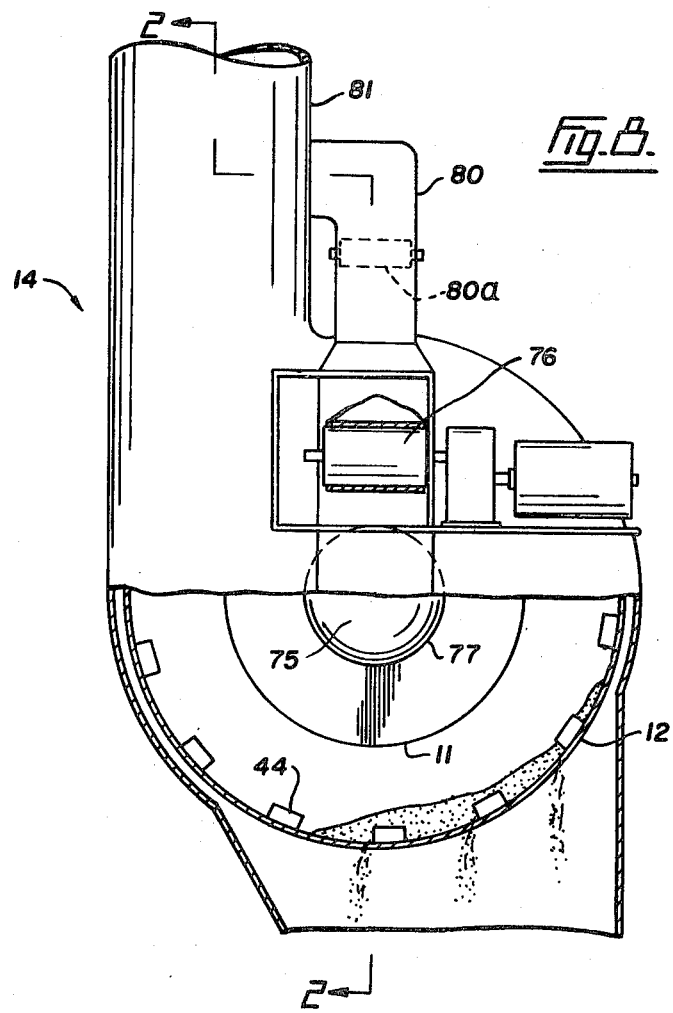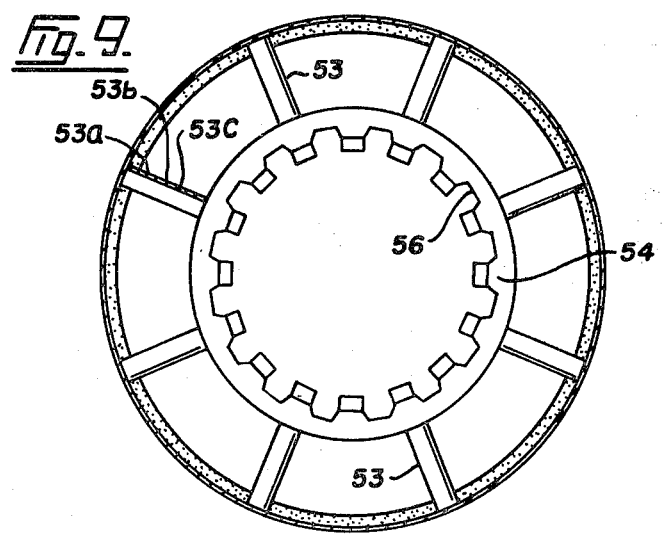

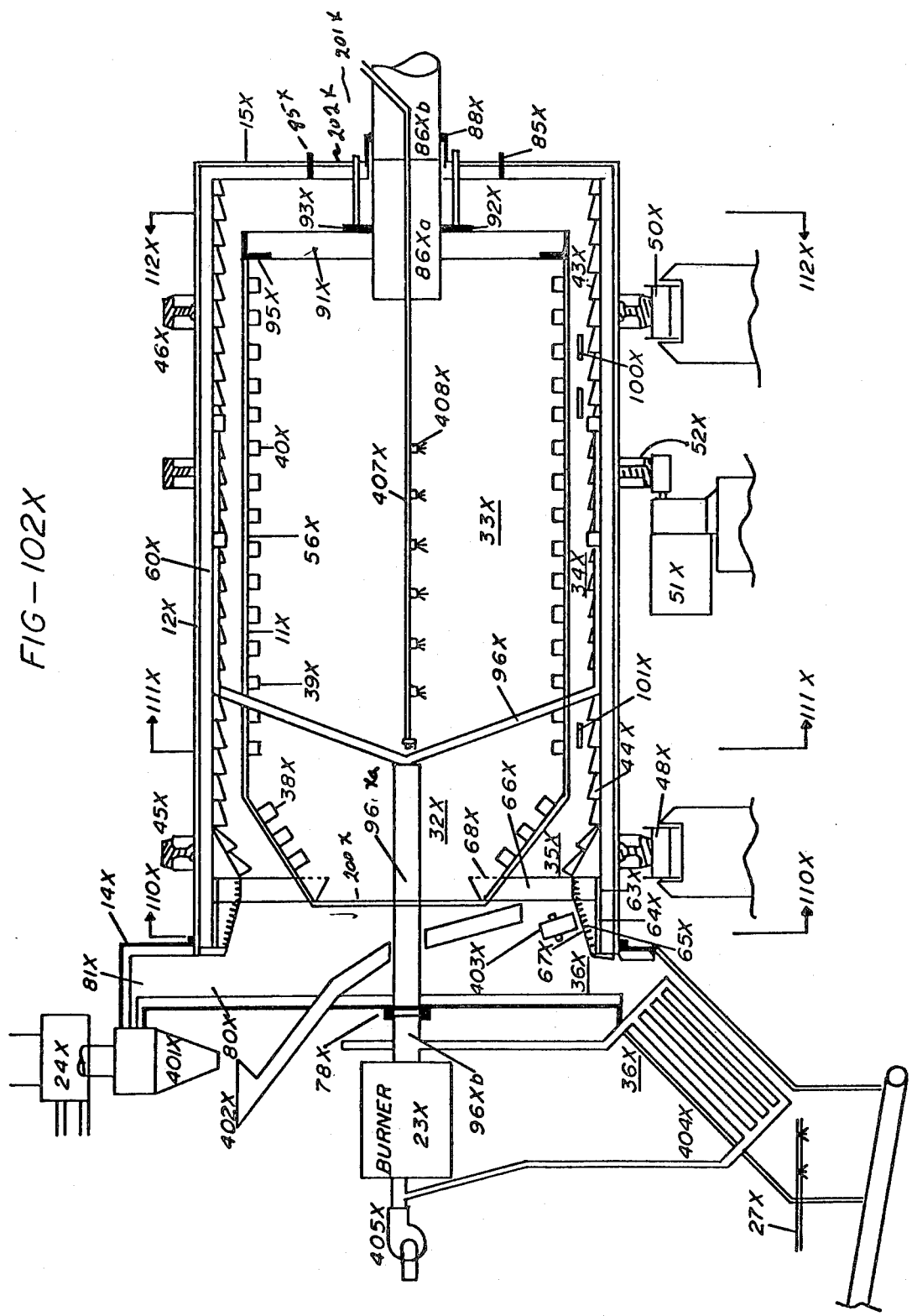

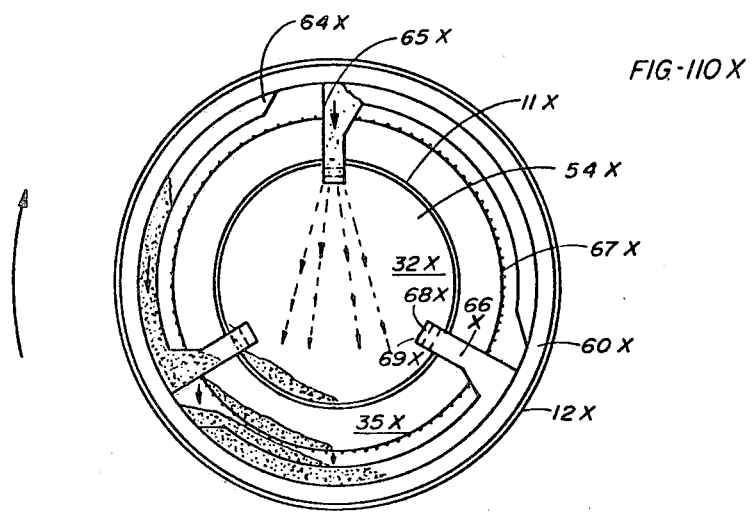
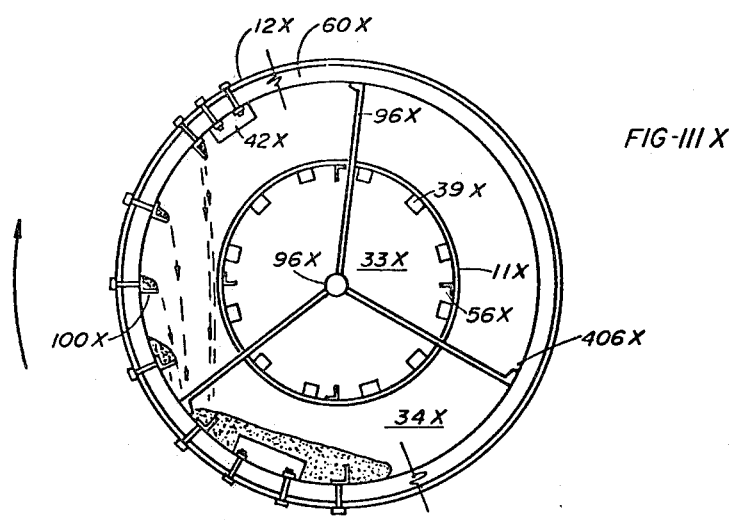
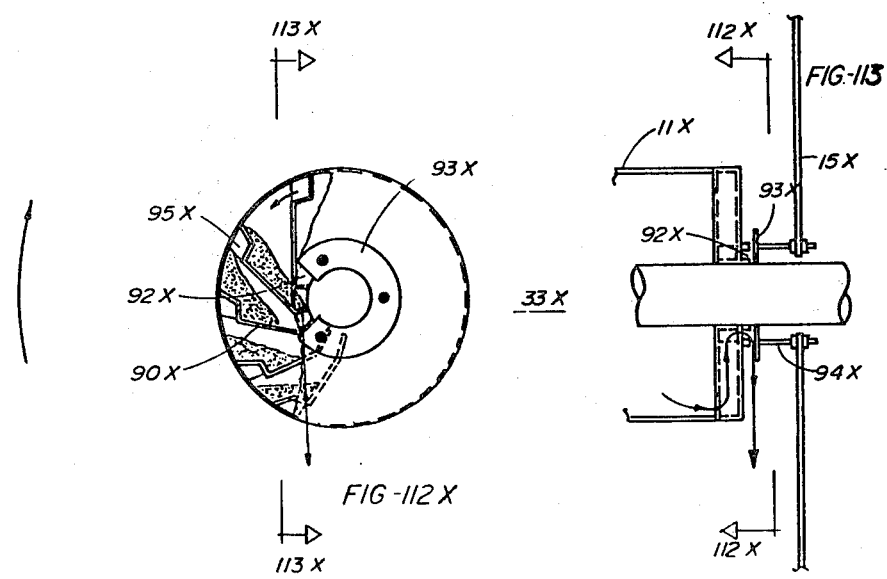

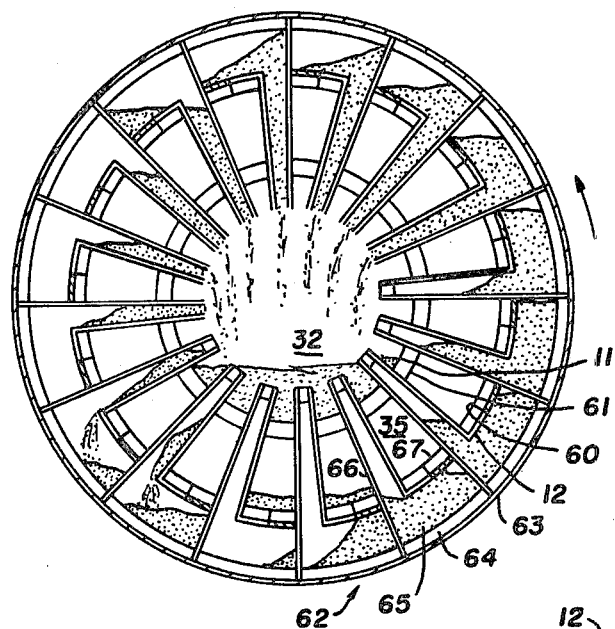
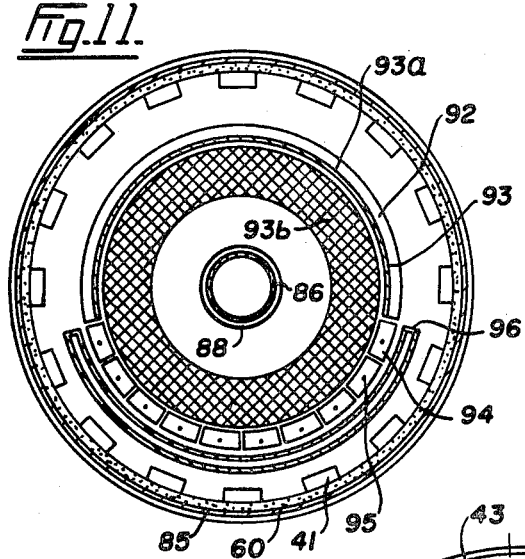
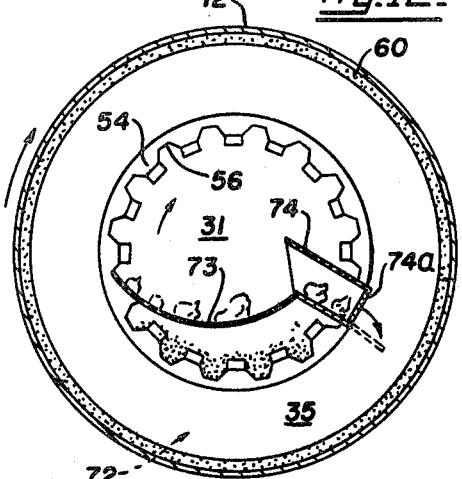
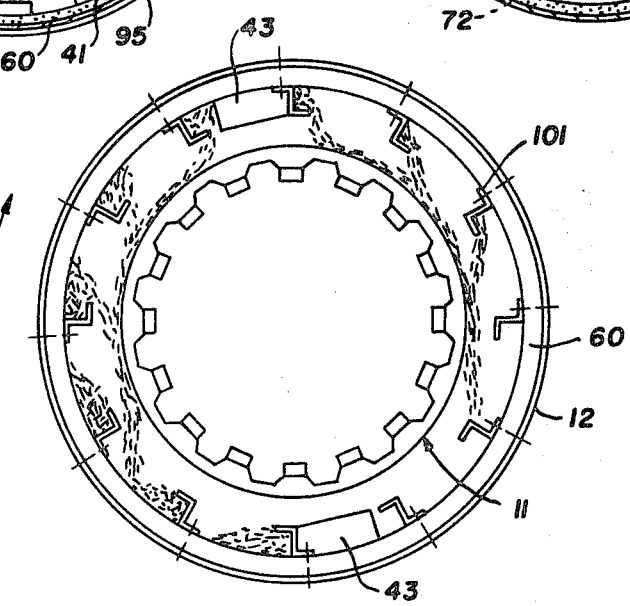

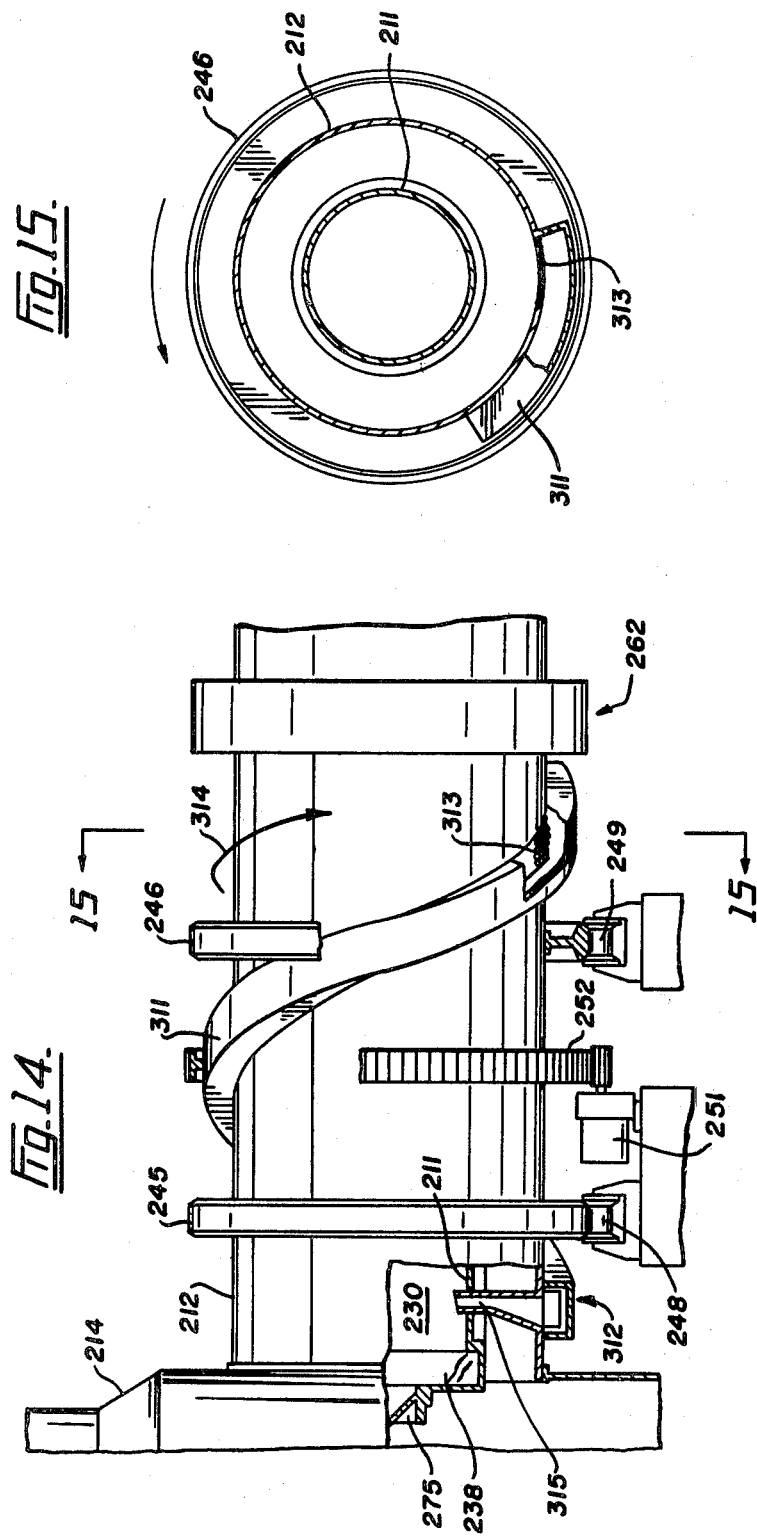

PROCESS FOR THERMAL CRACKING A HEAVY HYDROCARBON

This is a division of application Ser. No. 828,119 filed Sept. 26, 1977.

BACKGROUND OF THE INVENTION

1. Field of the Invention

This invention relates to the recovery of bitumen from rocks or sands and more particularly to a process and apparatus which results in increased recovery of bitumen from such sand using direct thermal separation. It also relates to the thermal cracking of hydrocarbons and recovery of the cracked products.

Large deposits of bituminous sand and shales are found in various localities throughout the world. The term "tar sand and ore" is used herein to include those materials containing hydrocarbons in various host materials. One of the most extensive deposits of tar sand occurs, for instance, in the Athabasca district of the Province of Alberta, Canada.

Typically the composition of these sands contain, by weight: from about 5% to about 20% of oil; from about 1% to about 10% of water; and from about 70% to about 90% of inorganic solids. The specific gravity of the bitumen varies from about 1.0 to about 1.05. The specific gravity of the bitumen as well as all other values of specific gravity given herein are taken at 60° F. The major portion, by weight, of the inorganic solids is fine grain quartz sand having a particle size greater than about 45 microns and less than 2000 microns. The remaining inorganic solid matter has a particle size of less than 45 microns and is referred to as fines. The fines contain clay and silt including some very small particles of sand. The fines content typically varies from about 10% to about 30% by weight of the solid inorganic content of bituminous sand. The true specific gravity of the sand is about 2.65 whereas that of the fines is about 2.7. This typical composition is only exemplary and it will be appreciated that the composition of bituminous sand varies from the stated ranges. For example, in mining the bituminous sand, clay which is found in layers of varying thickness in such sand areas may be admixed with the bitumen, thus increasing the inorganic solids content and particularly the fines content of the material to be processed.

In one aspect of the invention, part of the apparatus described, in modified form, is used to treat heavy hydrocarbon—containing feed stock. In this treatment, at least part of the hydrocarbons are cracked and the gaseous products are recovered. The feed stocks which have been used for this purpose include the wellhead products obtained by in situ recovery of heavy oil and refinery tower bottoms. Typically the hydrocarbons in such feed stocks may in large part be characterized by an API gravity less than about 25° API.

2. Brief Description of the Prior Art

Various methods have been proposed for separating bitumen from bituminous sand. The two best known methods are often referred to as the "hot water method" and the "cold water method." In the former, the bituminous sand is jetted with steam or hot water and mulled with a small proportion of water at about 175° F. The pulp is then dropped into a turbulent stream of circulating water and carried through a separation cell maintained at an elevated temperature of about 180° F. In the separation cell, entrained air causes the oil to rise to the top in the form of a froth rich in bitumen which is then drawn off.

The so-called "cold water method" does not involve heating the bituminous sand other than whatever heating might be required to conduct the operation at room temperature. The process involves mixing the bituminous sand with water, soda ash and an organic solvent such as kerosene. The mixture is then permitted to settle at room temperature. A mixture of water and bitumen dissolved in the organic solvent rises to the top of the settling zone and is recovered.

Both the hot water and cold water processes mentioned, as well as many variations on these processes and other processes suggested for recovery of bitumen from bituminous sand, involve a settling or separation step in which a fluid slurry of bituminous sand is introduced into a body of water so that bitumen rises to the top of the body of water, as a froth or a diluted oil, while sand settles to the bottom. In all such processes, the separation of oil from solids is not complete and some bitumen and solids, mostly fines, remain in the water. Likewise, the bituminous froth and ultimately the bitumen recovered from the process contains solids. Separation of both water and mineral solids from the froth is necessary for most ultimate uses of the bitumen, such as upgrading in conventional refining operations. Attempts to reduce the solids content of recovered bitumen usually result in an increase in the amount of bitumen associated with fines in the water discarded from the process, thus reducing bitumen recovery and polluting the water.

The described processes also produce a tailings sand that must be contained in tailings dams and result in very large water settlement areas. They are also relatively poor in percentage recovery of bitumen, and have major power and heat requirements for conducting the process.

U. S. Pat. No. 3,481,720 to Bennett describes a process and apparatus for removing hydrocarbons, by direct thermal conversion, from oil shale, oil sands and the like. The patent describes an apparatus in which several concentric cylindrical structures are made to rotate about their common, horizontal cylindrical axis. The feed material enters one end of the central cylinder and is moved through the cylinder as it rotates. An auger-like structure which extends from wall to wall within the cylinder provides the advancing means for moving the feed through the cylinder. Feed material is progressively heated as it advances through the inner cylinder and steam generated by this preheating is extracted by a small conduit extending axially through the cylinder. The preheated feed material advances into a retort zone provided by a larger cylinder surrounding the inner cylinder. In this area, hydrocarbon vapors are produced and withdrawn from the apparatus. A second auger-like drive, which also extends from wall to wall in the retort zone, advances the feed material through the cylinder toward the product removal end of the apparatus where the inorganic host material and its carbon residue is dropped into a larger surrounding cylinder which defines a combustion zone. A similar wall-to-wall auger drive arrangement in the combustion zone causes the material to reverse its direction of travel. The carbon content of the inorganic residue material is burned to provide heat for the process and the resulting carbon free heated material is partially recycled to the retorting zone. The unrecycled portion of the material is ejected from the feed end of the apparatus for disposal. Various heat exchange means are described for salvaging the heat content of the exhaust gases and solid waste emitted from the apparatus.

The Bennett apparatus relies on the presence of the feed material within the auger arrangement to provide a physical seal which prevents hydrocarbon vapor from flowing into the combustion zone and prevents oxygen in the combustion zone from entering the area where the hydrocarbon vapors are being produced. The feed material must of necessity be such as will advance through the restricted flow passages formed by the various auger drives.

While the proposed Bennett process eliminates certain of the problems and limitations present in the hot water and cold water methods described previously, the patented apparatus and related process include various limitations and inherent problems, especially when used with sticky, lumpy materials such as tar sands. An initial limitation is that the feed material must be initially processed so that the feed particles are small enough to move through the limited helical passageways provided between the cylinders and the auger or bladetype advancing elements described in the patent. The design of the Bennett structure is also such that little, if any, grinding or agitation is imparted to the particles as they advance through the apparatus so that any size reduction of the feed is limited to the effects of heating and mixing with steam or other gases.

Where tar sands or similar sticky feed materials are to be processed, the large surface areas associated with the auger and paddle advancing mechanism of the Bennett apparatus increase the possibility of sticking and plugging. There is no control on the recirculation of fines into the vapor production zone which increases the likelihood of contaminating the hydrocarbon vapors. In general, while the Bennett process and apparatus does not suffer from certain of the problems inherent in prior art attempts at removing hydrocarbons from tar sands and other ores, the patented process and apparatus nevertheless have various practical limitations which could render them undesirable or unsuitable for processing such ores.

SUMMARY OF THE FEATURES OF THE INVENTION

The apparatus of the present invention is constructed of two concentric, large-diameter tubes which are rigidly affixed to each other. Rings surrounding the outer tube permit the assembly to be rotated as a single unit which performs all transportation and thermal procedures required to remove hydrocarbons from feed material introduced into the apparatus. With the described structure, only a single primary moving structure, that is, the concentric inner and outer tube assembly, is required to obtain efficient hydrocarbon removal from the feed stock material. As a result of the simplicity of the structure, construction, operating and maintenance costs are reduced.

The apparatus of the present invention, because of its large open spaces and relatively small lifting and advancing elements, is capable of processing run-of-mine material. The feed end of the inner tube of the apparatus is provided with an ablation zone in which the run-of-mine feed material is tumbled, mixed with steam and water vapor and heated to effect rapid size reduction of feed material particles. The specially designed lifting elements carried on the inside of the inner tube lift the feed material and drop it while advancing elements also attached to the inner tube walls cause the feed material to move longitudinally through the tube. The repeated raising, dropping, advancing and tumbling motions produced by the lift and advance elements as the tube rotates cause the feed material to be intimately mixed with the steam and water vapor present in the inner tube and also improve the transfer of heat from the outer tube into the material in the inner tube. The transfer of heat into the inner tube is achieved by lifting hot solids, moving countercurrently through the annular space between the tubes, and dropping them onto the outer surface of the inner tube. A surprisingly efficient heat transfer is achieved by the combination of external moving contact between the inner tube and the annular solids and internal moving contact between the inner tube and its contained solids. Thus, with the use of only a rotating tube and properly positioned and designed lift and advance elements, water is evaporated from the feed stock materials, a size reduction in the lumps within the material occurs and the incoming feed material is preheated. Special screen and bypass assemblies are employed to remove oversize particles from the inner tube and shunt them directly to the outer tube where they may function to supply fuel in the combustion zone or are ejected from the system with the tailings.

The pressure in the apparatus is controlled so that steam and water vapor obtained from heating the water in the feed material produces a relatively high pressure area between the ends of the inner tube. An inert atmosphere is thus created preventing oxygen in the ablation zone from mixing with hydrocarbon vapors being produced in a vapor zone located at the opposite end of the center tube. By thus isolating the oxygen and hydrocarbon vapors without use of mechanical structures, the internal portions of the apparatus remain free and open to facilitate material movement through the tubes. Moreover, rather than being immediately withdrawn, the steam is permitted to mix with the incoming feed material to effect a heat exchange and to assist in the breaking down of lumps in the material. Pressure controls also maintain the inner and outer tubes at approximately the same pressure to eliminate the need for mechanical means to minimize gas flow between the tubes. A negative pressure may be maintained in the two tubes to prevent outward leakage of the potentially explosive hydrocarbon vapors. Additionally, reliance on physical plugging seals formed by the feed material is eliminated so that the necessary separation of the various gases is not dependent upon the content, flowrate or amount of material present at different points in the apparatus.

Throughout the apparatus, fines are prevented from contaminating the hydrocarbon vapors and from being removed in large amounts by the exhaust gases. This may be accomplished in part by minimizing the turbulence of material movement within the vapor production zone, blowing the fines past the recycle portion of the apparatus and dampening the tailings material before it is removed from the outer tube.

The preheated feed material in the inner tube is physically mixed with hot recycle sand which has had its carbon coating or residue burned away. These extremely hot sand particles rapidly vaporize hydrocarbons in the feed material. The resulting vapors are drawn out of the inner tube for subsequent processing. The sand is ejected from the vapor zone after having given up most of its hydrocarbon content and dropped into the combustion zone in the surrounding outer tube where the remaining carbon residue on the sand particles supplies fuel for a combustion reaction in the combustion zone which in turn provides the heat employed in the process. Means are described for controlling the introduction of sand into the combustion zone and for intimately mixing the sand with oxygen-containing air to produce optimum burning of the carbon residue on the sand particles. Also described are means for removing oversize particles within the feed material which would obstruct or otherwise interfere with the controlled passage of carbon bearing sand into the combustion zone.

A recycle mechanism is also described for automatically inserting a predetermined portion of the hot sand which leaves the combustion zone, free of its carbon content, back into the inner tube to be mixed with the feed material. In a preferred form, the recycle fixture includes means for feeding back all sand leaving the combustion zone until the sand is being recycled at a predetermined rate. Thereafter, the sand in excess of that required for recycling with the feed material is passed beyond the recycle fixture for subsequent heat exchange and disposal. A second recycle fixture is employed, where required, to recycle a portion of the sand closer to the inlet end of the inner tube to assist in preventing sticking or to otherwise assist in the flow of feed materials through the inner tube. An external burner supplied with fuel obtained from the extracted hydrocarbon vapors provides supplemental heat when required for initiating or maintaining combustion within the combustion zone of the apparatus. The preferred high velocity air stream emitted by the burner supplies oxygen for combustion of the carbon residue on the particles in the combustion zone, uniformly disperses the particles for good mixing with the oxygen and blows the fines in the material beyond the recycle mechanism to prevent the fines from being reinserted into the vapor zone.

The inner tube is preferably constructed of materials which optimize heat transfer across the tube walls except in the area of the vapor zone where a layer of refractory material prevents the intense heat produced in the surrounding combustion zone from overheating the vapor zone and simultaneously protects the material of the inner tube in this area from chemical attack because of the high heat. The remainder of the inner tube is preferably constructed of panels which are easily removable for replacement or repair. Thermally induced size changes are accommodated by the modular construction. Each panel may include integral lifting elements in the form of corrugations and integral advancing elements in the form of inclined blades. The panels are single piece castings which optimize contact heat transfer across the walls of the inner tube to secure maximum heating of the feed material moving within the inner tube.

A final cooling zone is provided for reducing the temperature of the tailings and generating steam and water vapor which is employed to additionally preheat the incoming feed material. The cool, damp tailings material may be easily handled by the removal equipment. The water used to dampen the tailings is preferably taken from the discharge fluid in a wet scrubber.

The discharge means for the steam, air, dust and combustion products is preferably provided by a single assembly located at the feed end of the system. This feed end structure also provides the necessary air locks and rotating seals to prevent undesired oxygen introduction into the apparatus and to prevent escape of exhaust gases.

As compared with the cold water and hot water processes, the process and apparatus of the present invention provide increased recovery and efficiency in that substantially all of the hydrocarbon content of the materials is removed as product or is burned to provide fuel for the process. By contrast, the water removal methods leave tailings which retain an appreciable hydrocarbon content.

A modified version of the apparatus is also described for thermally treating hydrocarbon-containing liquids, such as refinery bottoms or the products of in situ heavy oil recovery systems. This modified version also comprises concentric, radially spaced tubes. The tubes are secured together and are rotated about a common horizontal axis. Lift elements are provided on the inner surfaces of both tubes, to lift and drop particulate solids. Advance elements are also provided on said inner surfaces, to cause the particulate solids to advance through the inner tube and back through the annular space formed between the tubes. The tubes are initially provided with a charge of particulate solids, such as coke, sand or the like. Rotation of the tubes causes these solids to follow an oval path, as they continually move through a vaporization zone formed by the inner tube, into and through an annular combustion zone formed between the tubes, and are then returned to the inlet end of the inner tube. Means are provided to spray a liquid feed containing the hydrocarbons onto the hot solids in the vaporization zone. The hydrocarbons immediately vaporize and are cracked, simultaneously forming a carbon deposit on the solids. The gaseous hydrocarbon vapors are recovered from the vaporization zone and are condensed to form an upgraded liquid product. The carbon-coated solids are then contacted with oxygen and burned in the combustion zone. Residual solids may be subjected to screening to remove oversize material, and the undersize solids recycled to the inlet end of the inner tube. Some of the oversize solids may be crushed and returned to the inlet end of the inner tube supply supplemental solids as required. Alternatively, a portion of the residual solids may be withdrawn from the apparatus and discarded to keep the solids content in the apparatus at a generally constant level.

Other features, objects and advantages of the invention will become more readily apparent from the accompanying drawings, specification and claims.

BRIEF DESCRIPTION OF THE DRAWINGS

FIG. 8 is a feed end, elevational view, partially in section, of the apparatus of FIG. 2;

FIG. 9 is a cross sectional view taken along the line 9—9 of FIG. 2;

FIG. 10 is a cross sectional view taken along the line 10—10 of FIG. 2;

FIG. 11 is a cross sectional view taken along the line 11—11 of FIG. 2;

FIG. 12 is a cross sectional view taken along the line 12—12 of FIG. 2;

FIG. 14 is a partial elevation, partially broken away, illustrating details in a modified form of the invention;

FIG. 15 is a cross sectional view taken along the line 15—15 of FIG. 14;

FIG. 16 is a cross sectional view taken along the line 20—20 of FIG. 2, showing the lifters of the outer tube cascading hot solids onto the inner tube - the proportions of diameters of the inner and outer tubes is closer to what would actually be used in practice, as compared to the proportions in the other Figs. wherein a relatively large annular space was shown to permit details of mechanical elements in the annular space to be shown;

FIG. 102X is an elevation, mostly in section, taken along the rotational axis of the inner and outer tubes, illustrating details and representative features in the construction and operation of the inner and outer tubes and end frames of the invention.

FIG. 110X is a cross sectional view taken along line 110X of FIG. 102X and illustrates the arrangement and operating principles of the recycle ring portion of the invention. FIG. 111X is a cross sectional view taken along line 111X of FIG. 102X and illustrates the arrangement of pipes and nozzles for the oxygen-bearing gas system.

FIG. 112X is a cross sectional view taken along line 112X of FIG. 102X and illustrates the product end seal and solid particle discharge from the inner tube to the outer tube. A cross section through the seal is included for further clarification.

DESCRIPTION OF THE PREFERRED EMBODIMENTS

Figure 1:
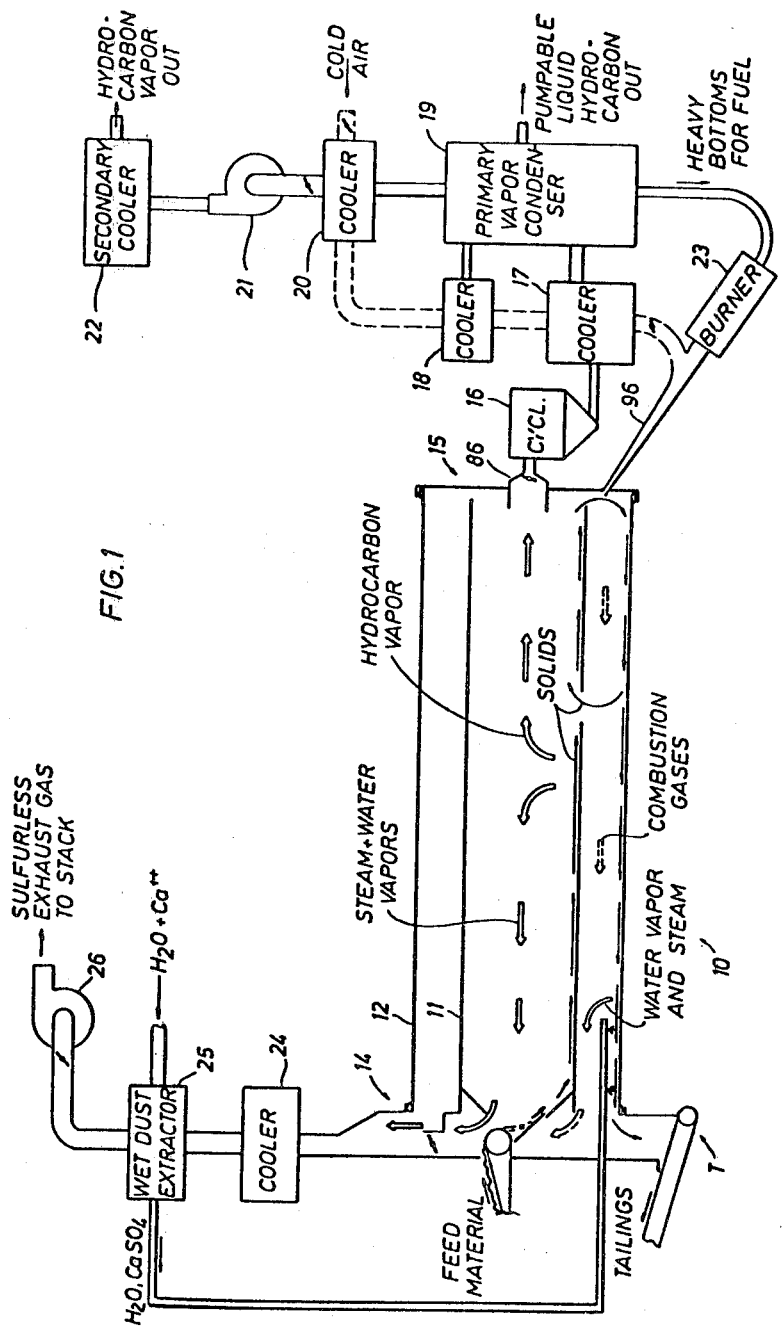
FIG. 1 is a schematic diagram illustrating the process and apparatus of the present invention.

FIG. 1 of the drawings is a schematic representation of the processing system of the present invention. The system employs a separating apparatus, indicated generally at 10, having an inner tube 11 and an outer tube 12. The two tubes are connected together and are rotated about their common long axes. The ends of the tubes extend between a stationary feed end structure 14 and a stationary product end structure 15. Feed material introduced into the inner tube 11 at the feed end advances through the tube toward the product end. As it advances, the feed is progressively heated to remove water and reduce particles to grain size. Hot recycle sand is added to the dehydrated feed material to complete cracking and vaporizing of the hydrocarbons. The remaining sand particles, which are coated with carbon are advanced to the end of the inner tube 11 and dropped into the outer tube 12. The carbon residue on the sand is oxidized by heated, oxygen containing air when it is dropped into the outer tube to produce the heat employed to dehydrate the feed material and to vaporize hydrocarbons in such material.

The direction of movement of the solids is reversed once the solids leave the inner tube and enter the outer tube 12 such that solids in the tube 12 are moved from the product end structure 15 toward the feed end structure 14. After the carbon deposits on the sand have been burned away, that portion of the sand which is not recirculated back into the inner tube is advanced to the feed end where it gives up its heat to the incoming feed material in the tube 11. The material is then dampened, dropped onto a conveyor assembly T and carried away to a disposal site or returned to the mine pit from which it was taken.

Water vapor and steam produced in the inner tube 11 are drawn into the feed end structure 14. The combustion gases produced in the tube 12 are also drawn into the end structure 14 after giving up a portion of their heat energy to the feed material in the inner tube. Hydrocarbon vapors produced in the tube 11 are drawn out of the apparatus and through the product end structure 15. The hydrocarbon vapors are then passed through one or more cyclone separators, such as the separator 16, which removes any fines in the vapors. Coolers 17 and 18 and a condensor 19 liquefy most of the hydrocarbon vapors which may then be pumped, at normal temperatures, to a user or processing facility (not illustrated). The ramaining unliquefied hydrocarbon vapors are further cooled by a cooler 20, compressed by a compressor 21, cooled by another cooler 22 and then conveyed to another user or processing facility (not illustrated).

The hydrocarbon vapors give up their heat to air which is passed through the coolers 17, 18 and 20. The resulting heated air supplies oxygen for use in the combustion of the carbon deposits on the solid materials dropped from the inner tube 11 into the outer tube 12. The air may be further heated by a burner 23 which is preferably fueled by the heavy bottoms taken from the vapor condensor 19.

The gases of combustion, water vapor and steam in the feed end structure 14 are passed through a cooler 24 to a wet scrubber type dust extracter 25. The dust-free gases are then drawn through an exhaust fan 26 to be ejected from a suitable exhaust stack (not illustrated). The water used in the scrubber 25 may be of the type having a high content of calcium ions ($Ca^{++}$) such as is frequently the case with mine pit drainage water. Such water is often the only type water available in many locations. This dissolved calcium species in the water combines with the sulfur dioxide ($SO_2$) in the exhaust gases to form calcium sulfite which, under the high temperature, high oxygen conditions existing in the wet scrubber, oxidizes to form calcium sulfate ($CaSO_4$). The water and suspended calcium sulfate resulting from the dust removal operation are applied by a sprayer 26 onto the hot, dry tailings just before the tailings are dropped out of the end of the outer tube 12. The fluid spray dampens the tailings to prevent dust formation while reducing the tailings temperature to facilitate subsequent handling. Most of the water in the spray is evaporated by the heated tailings and the resulting water vapor and steam heat the inner tube 11 and are then drawn away from the area through the feed end structure by operation of the fan 26. The calcium sulfate in the water spray is deposited on the tailings with which it is subsequently disposed.

Figure 2:
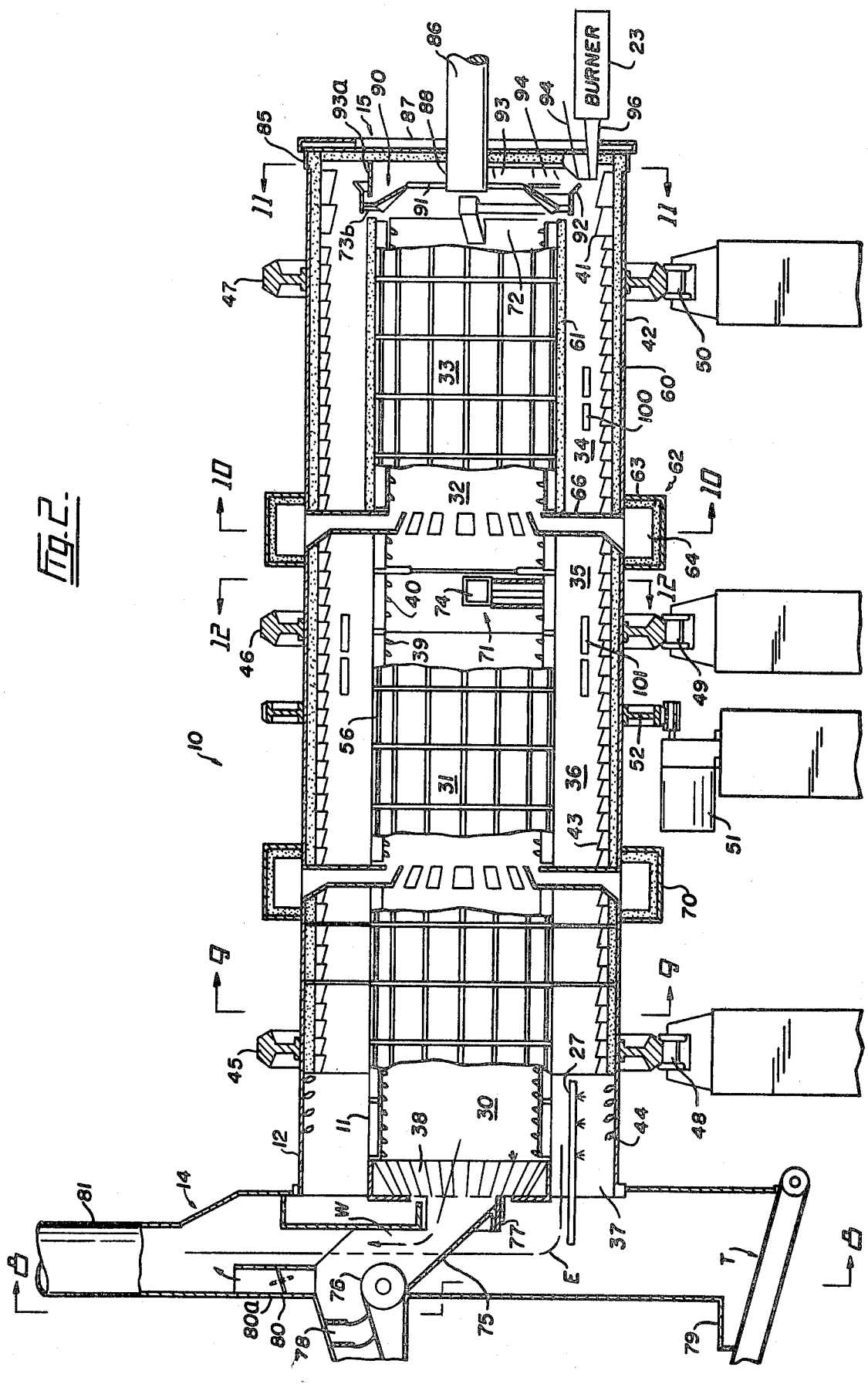
FIG. 2 is an elevation, partially in section, taken along the line 2—2 of FIG. 8, illustrating details and representative features in the construction and operation of the inner and outer tubes and end structures of the invention.

FIG. 2 of the drawings illustrates details in the construction and operation of the apparatus 10. The feed material introduced into the feed end of the apparatus 10 is first passed through an ablation zone 30 where it undergoes initial size reduction and heating. The feed material then advances to an inner heat exchange zone 31 from which it moves to an admixing zone 32. The material leaving the admixing zone advances into a vapor zone 33. At the end of the zone 33, the carbon coated, inorganic particles remaining in the feed material pass into a combustion zone 34 in the outer tube 12. The solid inorganic host material leaving the combustion zone is moved to a recycle zone 35 where a portion of the material is diverted and returned to the admixing zone 32. The remaining, non-diverted portion of the solid material passes from the recycle zone to an outer heat exchange zone 36. A relatively small portion of the solid materials moving through the zone 36 is diverted back to the inner heat exchange zone 31 and the remainder moves to a cooling and dampening zone 37 before being ejected into the feed end structure 14.

The common long axis of the inner and outer tubes of the apparatus 10 is substantially horizontally disposed. Internal advancing elements 38, 39 and 40, disposed in longitudinaly extending rows formed along the internal surfaces of the inner tube 11 and similar advancing elements 41–44 disposed in longitudinally extending rows formed along the inner surface of the outer tube 12, cause the solid feed material to move through the two tubes as the tubes are rotated about their long axes. The advancing elements 38–44 are oriented or inclined relative to the long axes of the tubes to cause the feed material to advance from zone to zone along the previously described path as it moves through the inner and outer tubes.

The outer tube 12 is mounted within, and secured to, three spaced riding rings 45, 46 and 47 which respectively rest on rollers 48, 49 and 50. One or more electric motors, such as the motor 51, impart rotary motion to the outer tube 12 through a ring gear 52 which is affixed to the tube 12. Suitable speed controls (not illustrated) regulate the operation of the motor 51 and also control the speed of rotation of the tube 12. The electric motor 51 has been illustrated as an exemplary prime mover for use with the apparatus 10. It will be readily appreciated however that any suitable power source and control means may be employed for respectively supplying rotary motion to the tube 2 and for controlling the rate and duration of such rotation as required to effect desired movement and processing of feed material, gases and tailings materials within the apparatus 10.

The inner tube 11 is spaced from and concentrically supported within the outer tube 12 by a series of radially extending braces 53. The braces 53 are mounted in sets in which each brace is equidistant from the adjacent braces as best illustrated in FIG. 9. Each set of braces lies in a plane which is set at a right angle to the long axes of the two tubes 11 and 12. Similar brace sets are spaced along the long axis of the apparatus 10 to provide the structural support necessary to maintain the inner and outer tubes relative to each other in the illustrated position while permitting a limited degree of movement between the two tubes as may be required to accommodate size changes caused by temperature variations. While the number and placement of the braces may be varied as required to meet these ends, it is important that the number, type and placement of supports between the inner and outer tubes be such as to permit relatively free movement of the feed material through the annular passage between the two components.

The braces 53 are of a composite construction which includes an outer layer of a suitable abrasion resistant material which forms a wear plate 53a. The wear plate surrounds a layer of insulation material 53b which in turn surrounds a central metal support rod 53c. The insulation helps to isolate the rod 53 from the high temperatures present in the apparatus 10 to prevent damage to the rod and to reduce dimension changes caused by temperature fluctuations.

The outer ends of the braces 53 are bolted or otherwise suitably secured to the outer tube 12. The inner ends of the braces are similarly connected to support rings 54 which form a portion of the structural framework for the inner tube 11. Longitudinally extending crossbars 55 connect to panels 56 to complete the basic structure forming the inner tube. Only exemplary braces have been illustrated in FIG. 2. In the preferred form of the invention, a set of braces extends between each supporting ring 54 and the outer tube.

Figure 5:
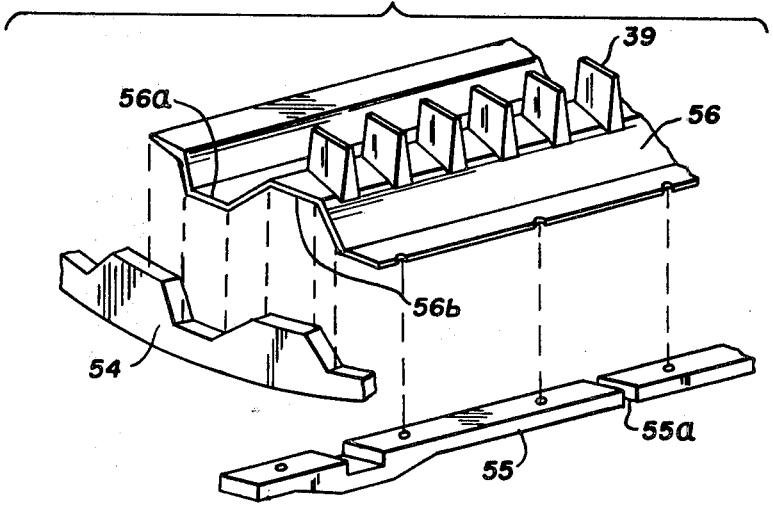
FIG. 5 is an exploded partial view, in perspective, illustrating the relationship between the panels, support rings and cross bars forming the inner tube.

FIG. 5 best illustrates the relative connection of the support rings 54, crossbars 55, and panels 56. The panels and crossbars are bolted or otherwise suitably secured to each other by means which permit them to be easily separated when necessary for replacement or repair. The rings 54 are clamped between the panels 56 and crossbars 55 such that a single panel extends between two adjacent support rings and spans the gap 55a formed between adjacent crossbars. As best illustrated generally in FIG. 2, a large number of panels 56 are connected together by means of the ring and crossbar components to provide a composite structure for the inner tube 11. This construction technique substantially reduces time and expense required for many repairs since individual panels may be replaced as required thus eliminating the need for in-place patching or reconstruction. An additional important benefit derived from the described construction and brace mounting of the inner tube is that dimension changes induced by temperature variations are accommodated without significant distortion of the inner tube and without substantial movement of the inner tube relative to the outer tube 12.

The panels 56 are preferably unitary metal castings, which include the advancing elements 39 and 40, to maximize heat transfer through the panel walls. The panels are also preferably corrugated, with internal depressions 56a and external depressions 56b, to increase their strength and to further aid in transferring heat from the outer tube to the feed material in the inner tube in a manner to be hereinafter more fully explained.

The outer tube 12 is constructed of a metal shell having a partial lining 60 of refractory material. In the combustion zone 34, the inner tube is provided with a coating 61 of similar refractory material. The lining 60 and coating 61 are desirably constructed of a refractory material in the 40–80% alumina range, with a course grog. The refractory coating 61 serves the dual purpose of providing thermal insulation to prevent the vapor zone 33 from being overheated and protecting the metallic material of the inner tube in the area of the combustion zone 34 from damage due to abrasion or, more importantly, oxidation or other chemical attack. The lining 60 functions to retain heat within the apparatus and to protect the surrounding metal shell of the tube 12 from abrasion and chemical attack.

A primary recycle fixture indicated generally at 62, which may best be described with joint reference to FIGS. 2 and 10, diverts a portion of the solid material moving through the outer tube 12 back into the inner tube 11 where it is combined with the incoming feed material. The primary recycle fixture includes an annular housing 63 which extends about the outer tube 12. Compartments 64 are formed in the housing 63 by suitable dividing walls 65. Tapered recycle tubes 66 extend from each compartment 64, through the inner and outer tubes 11 and 12, and into the admixing zone 32. Solid material in the recycle zone 35 falls into the chambers 64 through screens 67 which prevent large particles from being recycled. As the tubes 11 and 12 rotate, each of the chambers 64 is eventually elevated to the point that the solid material in the chamber flows through the tubes 66 into the admixing zone 32.

Figure 13:
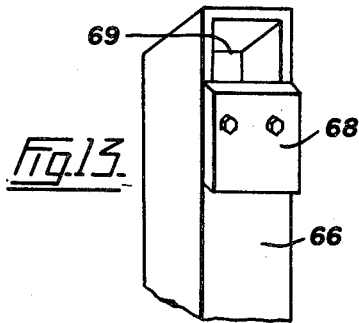
FIG. 13 is a detailed partial view, in perspective, illustrating details in the construction of the outlet opening for the recycle tubes of the invention.

The rate of material flow from the tubes 66 into the admixing zone 32 is preferably adjustable to accommodate different materials and to permit alterations in the amount of material being fed back as required to achieve a desired procsssing result. FIG. 13 illustrates a removable face plate 68 which is bolted or otherwise releasably secured to each of the tubes 66 to define an outlet opening 69. By changing the size or location of the plates 68 in the tubes 66, the dimensions of the outlet openings 69 may be altered as desired. Other suitable means for varying the rate of material feedback may also be employed.

An auxiliary secondary recycle fixture, indicated generally at 70, also provides for feed back of solid material from the outer tube 12 to the inner tube 11. The fixture 70 is employed primarily where the feed material tends to adhere to the internal surfaces of the inner tube. The operation and construction of the fixtures 62 and 70 are similar. The auxiliary fixture 70 would ordinarily recycle only a fraction of the amount of material being recycled by the fixture 62. Certain of the tubes and/or compartments of the fixtures 70 are completely closed, or partially closed, to regulate the amount of material recycled. In many applications, the secondary feedback fixture may not be necessary at all in which case all of the openings into the compartments from the outer tube and the tube outlet openings of the fixture 70 are covered over by metal plates or other suitable means.

Oversized feed material particles in the inner tube 11 are removed from the inner tube and shunted directly to the outer tube by two similar screen and bypass assemblies indicated generally at 71 and 72. The construction and operation of the two bypass assemblies may best be understood by joint reference to FIGS. 12 and 2. FIG. 12 illustrates details in the assembly 72 which is similar in construction and operation to the assembly 71. Curved metal bars 73 in the assembly 72 are spaced from each other to form a screen through which small size particles may pass as the inner tube rotates. Oversized particles which cannot pass through the spaces between the bars roll or slide along the bars to the opening of a bypass chute 74. Particles falling into the chute force open a door 74a which is spring biased to the normally closed position. The door 74a minimizes the transfer of gases between the two tubes. A revolving door arrangement, or other suitable means may also be employed for the same purpose. In the preferred form of operation of the invention, no significant pressure differential exists between the inner and outer tubes, so that the door 74a and other mechanical sealing means function as back up safety devices. Depending also on the material being processed, only a single screen and bypass assembly may be sufficient in which case only the assembly 72 would be employed.

Referring jointly to FIGS. 2 and 8, the feed end structure 14 is seen to be equipped with an enclosed feed chute 75 which directs feed material dropping from the conveyor assembly 76 into the inner tube 11. The panels at the end of the inner tube are inclined to retain the feed material and to help quickly advance the material away from the mouth of the tube 11. The advancing elements 38 have large surfaces and a high angle of attack to assist in quickly moving the incoming feed material away from the mouth of the tube 11.

A seal ring 77 provides a gas seal between the stationary chute 75 and the rotating inner tube 11. The seal 77 cooperates with the enclosed chute 75 and air locks indicated generally at 78 and 79 to prevent external air from being drawn into the inner tube. The air locks 78 and 79 may be provided by any suitable conventional mechanisms which respectively permit the solids in the feed material to enter and to leave the apparatus 10 while maintaining a pressure seal. Water vapor and steam, indicated by the arrow W in FIG. 2, produced within the inner tube 11 are drawn out through the chute 75, past a damper chamber 809 and into an exhaust conduit 81. Gases in the outer tube 12, indicated by the arrows E in FIG. 2, are drawn directly into the exhaust conduit 81.

The product end structure 15 is also equipped with a ring seal element, indicated at 85, for providing a pressure seal between the stationary end structure and the rotating outer tube 12. A vapor removal conduit 86 extends through an end plate 87 in the structure 15 to remove hydrocarbon vapors being produced in the inner tube. The vapors in the conduit are supplied to the cyclone separator 16 (FIG. 1) for subsequent treatment as previously described. The conduit 86 is welded or otherwise suitably affixed to the end plate 87 so that no gas passage may occur across the junction. The end of the conduit 86 extends into a collar 88 which forms a part of the inner tube end assembly. A close fit is provided between the rotating collar 88 and the stationary conduit 86 to minimize gas leakage into the area between the end structure 15 and the end of the tube 11.

The end assembly of the tube 11 is provided with an annular screen section 90 which tapers from the end of the tube to an end plate 91 supporting the collar 88. A flared, annular lip 92, which is also part of the end assembly of the tube 11, extends away from the tube toward a curved, adjustable lip arrangement, indicated generally at 93, carried by the stationary end structure 15. A hood section 93a extending from the end structure 15 rides against a cylindrical seal surface 93b on the tube 11 to minimize gas flow into or out of the tube 11. The configuration, construction and relative placement of the lip arrangement 93 and hood 93a may be more fully appreciated by joint reference to FIGS. 2 and 11 of the drawings. The lip arrangement 93 is comprised of a plurality of hinged panels 94 which may be moved toward or away from the lip 92 by rods 95. The rods 95 are employed to vary the spacing between the two lip structures 92 and 93 which in turn controls the pattern and rate of sand flow from the inner tube into the outer tube.

The burner 23 is equipped with a curved discharge plenum 96 which projects into the outer tube and extends about the lip structure 93. As will be explained more fully hereinafter, hot air from the heater is discharged from the plenum 96 into the curtain of sand falling from the inner tube. While illustrated as being symmetrically developed about a central vertical axis, it should be noted that in operation, the plenum 96 is shifted about the vertical axis as required to properly direct the gas flow into the falling sand. Thus, because of the rotation of the two tubes 11 and 12, the falling sand does not form a pattern which is symmetrical about a vertical axis. Accordingly, the plenus 96 must be adjusted as required to properly direct the gas flow into the sand curtain.

As previusly noted, the advancing elements 39 and 40 on the inner surface of the tube 11 are formed as an integral part of the panel 56 and are inclined relative to the long axes of the tube 11 and 12. The elements 39 and 40 move the solid feed material from the feed end toward the product end of the apparatus 10 as the tubes 11 and 12 rotate in the direction indicated in the drawing illustrations. The size and inclination of the advancing elements on the panel 56 are changed between the inner heat exchange zone 31 and the admixing zone 32 to increase the rate of material travel through the admixing zone and the vapor zone 33.

Figure 3:
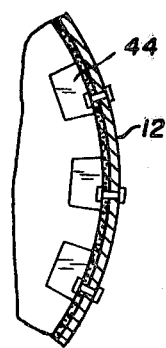
FIG. 3 is an enlarged scale, partial view, in cross section, illustrating details in the construction and placement of advancing elements in the cooling and dampening zone of the outer tube.
Figure 4:
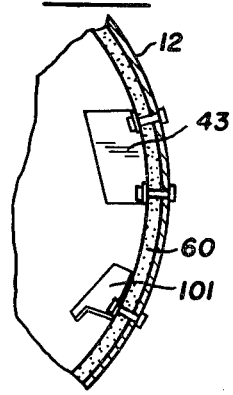
FIG. 4 is an enlarged scale, partial view, in cross section, illustrating details in the construction and placement of the lift and advancing elements employed in the outer heat exchange zone of the outer tube.
Figure 6:
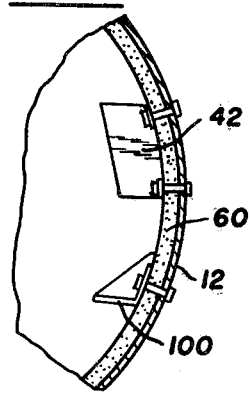
FIG. 6 is an enlarged scale, partial view, in cross section, illustrating the construction and placement of the lift and advancing elements employed in the combustion zone of the outer tube.
Figure 7:
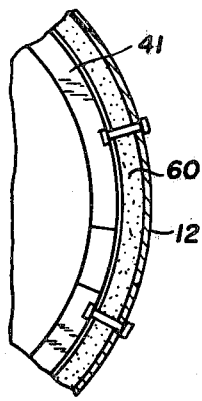
FIG. 7 is an enlarged scale, partial view, in cross section, illustrating the construction and placement of the advancing elements in the end of the combustion zone of the outer tube.

The advancing elements 41, illustrated in detail in FIG. 7, are bolted onto the inner surface of the tube 12. The angle of inclination of the advancing element 41 is selected to quickly move solid materials away from the discharge plenum 96 to prevent any buildup which might obstruct the hot air discharge from the burner. Further into the combustion zone 34, the advancing elements 42, illustrated in detail in FIG. 6, are bolted into the tube at an angle which permits slower movement of the solid material. The advancing elements 43, illustrated in detail in FIG. 4, are also bolted into place within the tube 12 at an inclination which produces the desired retention time of the solid material within the outer heat exchange zone 36. FIG. 3 illustrates details in the construction and mounting of the advancing elements 44 which move the dampened tailings out of the apparatus 10.

In addition to advancing the solid feed materials through the apparatus 10, it is also desirable, for reasons which will hereinafter be explained, to lift and drop the material at selected locations within the apparatus. The internal depressions 56a (FIG. 5) in the panels 56 lift and drop the material falling into the depressions as the inner tube rotates. In the vapor zone 33, the internal depressions 56a are more shallow to minimize material movement which could produce undesired fines in the hydrocarbon vapors.

Flat-faced lifters 100, illustrated in detail in FIG. 6, are bolted into the inner surface of the tube 12 in the combustion zone 34. Cup-faced lifters 101, detailed in FIG. 4, having an increased lifting capacity, are bolted into the tube 12 in the outer heat exchange zone 36. Throughout the apparatus 10, wherever possible, the various lifting and advancing elements in the outer tube are removably secured by bolts or other suitable means so that they may be easily removed and replaced. Only exemplary lift and advance elements are illustrated in FIG. 2 of the drawing; it will be understood however that the respective elements are positioned over the entire inner walls of the tubes in the indicated areas.

Operation of the Apparatus 10

For the purpose of the description to follow, it is assumed that the feed material is tar sands from the Athabasca district. Initially, the unit 10 is brought up to operating temperature by using the burner 23 which supplies hot air, at approximately 1200° F., into the combustion zone 34. When the temperature of the apparatus 10 is approximately 900° F., purge steam is introduced into the tube 11 by any suitable means to remove all oxygen containing air within the tube. With the tubes 11 and 12 rotating, feed material on the belt portion of the conveyor 76 is passed through the air lock 78 into the feed end structure 14. The feed material falling off of the end of the conveyor slides down the chute 76 into the rotating inner tube 11. The advancing elements 38 cooperate with the inclined panels at the tube end to quickly move the feed material into the tube, away from the tube opening to prevent any accumulation of the feed material at the opening. The slope of the panels, the size and placement of the elements 38, the rate of rotation of the tube 11 and the rate of feed supply to the apparatus 10 are controlled as required to smoothly process the feed material at a desired rate. When the raw feed material is first introduced into the tube 11, it may include, in addition to the small hydrocarbon-coated sand particles, much larger agglomerated particles formed of the same material or comprised of rocks, clays or other different materials. Substantial size reduction will occur in most of the oversize particles as they are heated, combined with steam, dehydrated and tumbled about in the rotating tube 11.

The panels 56 in the tube 11, between the feed end inlet and the beginning of the vapor zone 33, pick up some of the oversize particles which fall into the panel depressions 56a and are wedged in the space between adjacent advancing elements 39 or 40. These oversize particles as well as the smaller feed particles which fall into the depressions 56a are repeatedly raised and dropped as the tube 11 rotates. In the ablation zone 30, this physical tumbling assists in breaking the feed material into smaller particles as it grinds against itself and the tube walls. The lifting and dropping also increases the surface exposure of the feed material to the hot tube walls, steam and water vapor traveling through the tube 11 to provide uniform preheating and dehydration of all of the feed material.

The advancing elements 39 and 40 impart forward motion (left-to-right as viewed on FIG. 2) to the material within the tube 11 as the tube rotates. Oversize particles which do not rest within the depressions 56a bounce or roll from one row of advancing elements to the next so that such particles are more vigorously tumbled than the smaller particles which fall into the depressions 56a. The smaller particles also advance through the tube more slowly than the oversized particles since the smaller particles are impelled forward much less frequently than the oversize particles. This results from the fact that the small particles ride from the bottom of the tube 11 in the depressions 56a until they are elevated toward the top of the tube where they then fall out and slide forward along the inclined advancing elements. Smaller particles thus are moved forward approximately twice per revolution of the tube 11 while oversize particles are advanced by each row of advancing elements in the tube. In addition to increasing the grinding effect on these large particles, the oversize particles which resist size reduction are rapidly moved toward the screen and oversize removal 71 so that they may be quickly ejected from the tube 11. This treatment of the oversize particles minimizes heat loss to the particles and prevents build-ups which might retard the flow of material through the apparatus 10. Differential treatment of particles in the tube 11 also produces a churning, mixing action which enhances the heat transfer, water removal, grinding and ablation effects.

To increase grinding and heat exchange, the retention time for the feed material is desirably relatively long in the area between the beginning of the ablation zone 30 and the beginning of the screen and bypass assembly 71. Thereafter, it is desirable to increase the speed of material advance and to reduce the tumbling action. By this means, the generation of gas carried fines is reduced, small material particles are rushed past the bypass assembly 71 and the added volume of material being introduced in the admixing zone is prevented from accumulating. Accordingly, the panels 56 are modified in the area of the admixing and vapor zones such that the angle of attack and size of the advancing elements is increased and the depth of the panel depressions is decreased.

As best illustrated in FIG. 12, the particles which cannot pass through the screen formed by the screen rods 73 are rolled or slide along the rods as the tube 11 rotates. The oversize particles are thus raised into the opening of the bypass chute when the chute passage is essentially vertically oriented. Oversize particles removed by the assembly 71 are ejected without being passed through the combustion zone 34. In a preferred embodiment where tar sands are being processed, such oversize particles would normally have at least one dimension which exceeds approximately twelve inches. Smaller oversize particles removed by the second assembly 72 are dropped into the combustion zone where, depending upon their composition, they may provide fuel for the combustion.

As the raw feed material is increasingly heated in the tube 11 to 212° F., the water in the material is evaporated to form steam and water vapor. Maximum steam generation occurs in the area of the inner heat exchange zone 31. The partial pressure of this steam produces pressure values in the zone 31 which are slightly higher than those in either the ablation zone 30 or the vapor zone 33. The fans 26, damper 79 and compressor 20, or other suitable means, are operated to maintain the pressure levels in the ablation and vapor zones below atmospheric pressure existing outside of the apparatus 10. By this means, the water vapor and steam in the higher pressure area existing in the zone 31 flow to the ablation zone and are extracted through the conduit 31. Hydrocarbon vapors are produced as the feed material is further heated in the admixing zone 32 and vapor zone 33. These vapors are drawn away through the conduit 86.

From the foregoing it may be appreciated that the high pressure area produced by the steam generation provides a barrier or inert sealing atmosphere which prevents the hydrocarbon vapors from being drawn away through the exhaust conduit. The pressure barrier also prevents the majority of the oxygen containing gases present in the ablation zone from combining with the combustible hydrocarbon vapors generated in the vapor zone so that the extracted hydrocarbon vapors remain substantially pure and cannot combine with oxygen to form a potentially explosive mixture.

When processing feed materials having water and hydrocarbon content, the maintenance of the high pressure steam area in the tube 11 is an important feature of the present invention in that it eliminates the need for mechanical seals or other means which might impede the material flow or add to the cost of constructing or operating the refining apparatus 10. Any suitable means or control which will maintain the pressures existing in the ablation and vapor zones below that existing toward the center of the tube 11 may be employed for this purpose. If no significant amounts of water or oxygen are present in the feed material, it may be desirable to close a damper 80a so that all gases are withdrawn through the conduit 86. It will also be appreciated that the pressures existing in the ablation zone 30 and vapor zone 33 may be established or altered as required to obtain any desired gas flow through the tube 10. Thus, while subatmospheric pressures are considered preferable in the vapor and ablation zones for processing feed material such as tar sands, super atmospheric conditions in these zones may be desirable for other feed materials or for effecting different processing of the tar sands.

As the feed material enters the admixing zone 32, it has been substantially dehydrated and preheated to approximately 250° F. to 425° F. In the zone 32, the feed material is mixed with hot, solid recycle sand particles which, as will hereinafter be more fully explained, are recycled from the outer tube 12. The addition of these recycle particles, which are at about 1000° F. to 1250° F., significantly heats the feed material to vaporize the majority of the hydrocarbons in the material. The proportion of added recycle material is selected to provide sufficient heat energy to bring the combined mixture of recycle material and feed material in the vapor zone 33 to approximately 900° F. to 1000° F. The resulting hydrocarbon vapors are drawn from the vapor zone 33 by the suction conduit 86. Flow velocities and material turbulence are maintained at a minimum in the vapor zone 33 to reduce fines entrapment in the vapors.

The vapors leaving the tube 11 through the conduit 86 are cleaned by the cyclone separators 16 (FIG. 1). If desired, the vapors may be further cleaned with the use of suitable precipitators (not illustrated) or bottom oil recycle means (not illustrated) in the lower part of the condenser unit 19. The cleaned vapors may be either fractionated or condensed as a single product.

The solid particles being introduced by the feed material stream give up most of their hydrocarbon content as vapors but retain a residue or coating of carbon. The recycle sand particles added from the combustion zone in mixing with the feed material also take on a carbon coating. The temperature and retention time of the material in the vapor zone 33 is controlled to allow optimum thermal cracking and deposition of carbon on the solid host particles so that the following combustion of the carbon deposits will provide sufficient heat for sustaining a balanced process.

When tar sands are the feed material, the majority of the feed material has been reduced to individual small grains of sand by the time the material begins to reach the product end of the tube 11. At the outlet end of the vapor zone 33, any remaining oversize particles are shunted directly to the combustion zone 34 by the screen and bypass assembly 72. The smaller chunks and grains are passed through the screen 90 and dropped through the slot formed between the lips 92 and 93. Larger particles which do not pass through the screen eventually break down or fall into the bypass 72.

The lip 93 is adjusted relative to the lip 92 so that the rotating action of the tube 11 causes the material in the drum 11 to drop into the combustion zone 34 in a curtain-like pattern. The stream of high velocity hot air emitted by the outlet plenum 96 of the burner 23 strikes the curtain of falling particles along its full length. The air stream, which travels at approximately a right angle to the plane of the sand curtain produces a Venturi effect which assists in drawing the sand out of the tube 11 and ensures that any gas flow will be only from the tube 11 into the tube 12. The air mixes with the particles and disburses them into the combustion zone 34. The air stream is controlled to provide sufficient oxygen for complete combustion of the carbon deposited on the sand grains.

During initial start up, or when otherwise required, the burner 23 is employed to heat the injected oxygen containing air to the temperature required for combustion of the carbon coating on the sand falling into the combustion zone. As previously explained, the injected air is heated by the extracted hydrocarbon vapors before it reaches the burner 23. Once the combustion is initiated, the resulting heat in the zone 34 is normally sufficient to sustain the combustion without need for a supplemental heating of the injected air by the burner 23.

The high velocity air injection cooperates with the lifting elements 100 to provide massive turbulence in the combustion zone to ensure maximum oxidation of the carbon on the sand particles. In addition, the air stream supplied from the burner plenum 96 also carries fines of approximately −270 M past the recycle zone 35 and into the outer heat exchange zone 36 so that these fines are not reintroduced into the vapor zone 33. Heavier particles are repeatedly lifted and dropped by the lift elements 100 as they are moved toward the feed end of the tube 12 by the advancing elements 42. The lifting elements 100 and advancing elements 42 are designed to provide maximum contact between the air and sand in the combustion zone. At the outlet end of the combustion zone, the sand grains are at approximately 1100° F. to 1300° F.

In the preferred form of the invention, the pressures in the admixing zone 32, vapor zone 33 and combustion zone 34 are maintained substantially equal to reduce the amount of cross flow of gases between the two tubes. These pressures are maintained by proper positioning of the damper 80a and by proper positioning of dampers or other control means, indicated generally in FIG. 1, on the vapor compressor 21 and the fans supplying the burner 23. By these means, the hydrocarbon vapors in the zone 33 are prevented from flowing through the sand discharge slot and mixing with oxygen to form a combustible mixture and, the vapors in the zone 33 are also prevented from flowing into and burning in the zone 34.

As best explained by joint reference to FIGS. 2 and 10, a portion of de-dusted coarser sand grains leaving the combustion zone 34 falls through the screens 67 into the compartments 64 of the recycle fixture 62 to provide the hot recycle material. As the tubes 11 and 12 rotate, the recycle material in the compartments is elevated and dropped through the recycle tubes 66. The presence of the hot recycle material in the tubes 66 and in the compartments 64 forms a plug or seal which also assists in preventing gas flow between the inner and outer tubes. This is best illustrated in FIG. 10 which shows that each tube 66 is at least partially filled with recycle material, or the associated compartment 64 is full of such material so that the inlet to the tube 66 is blocked, or the outlet of the tube is covered over by the material in the tube 11. The physical seal provided by the sand in the described operation of the recycle fixture 72 is an added safety feature which, along with the maintenance of small pressure differentials between the two tubes further prevents the cross flow of gases.

No sand in the tube 12 advances past the screens 67 until the compartments 64 are substantially full. By this means, the recycle material requirements are satisfied before any of the hot sand is discarded to the outer heat exchange zone 36. This capability of the recycle fixture ensures a supply of recycle material even when the rate of feed material input is temporarily reduced or during other upset conditions. The physical seal and the storage functions of the recycle fixture may be controlled to accommodate different recycle material and different rotation rates for the tubes 11 and 12 by appropriately sizing the openings 69 at the outlets of the recycle tubes 66.

That portion of the hot, hydrocarbon free material which is not recycled, approximately 20% to 40% of the total sand entering the combustion zone, is advanced to the outer heat exchange zone 36. In the zone 36, the sand is handled and retained to optimize transfer of heat to the incoming feed material in the tube 11. To this end, the sand in the zone 36 is repeatedly elevated and dropped onto the outer surface of the inner tube 11 as it is slowly advanced through the tube 12. (See FIG. 16) Some of the material striking the inner tube falls into the external depression 56b (FIG. 5) of the panels 56 where it remains until it falls out as the tube is rotated. The single piece construction of the panels 56 permits optimum heat transfer from the heated particles, through the body of the panel and into the advancing elements 39. As a result of the efficient contact heat transfer, a large portion of the heat in the hot sand is transferred to the raw feed material riding on the internal surface of the tube 11. The sand leaving the zone 36 is at approximately 400° F. to 600° F. The combustion gases also give up a large portion of their heat, by conduction and convection, to the inner tube 11. Typically, the gases leaving the combustion zone will be at 1100° F. to 1300° F. and will leave the zone 36 at about 400° F. to 650° F.

Depending upon the material being processed, the recycle fixture 70 may be used to divert a portion of the hot sand into the tube 11 to prevent the raw feed material from sticking to the internal walls of the tube 11 or to otherwise assist in the process.

The material moving beyond the fixture 70 continues to be raised and dropped against the inner tube 11 until it reaches the end of the liner 60. At this point, the material is sprayed with liquid from the sprayer 27 to prevent fines from being picked up by the stream of combustion gases flowing into the end structure 14 and to cool the material as well as to evaporate the water in the fluid. The steam water vapor and other gases resulting in the cooling and dampening zone 37 give up a portion of their heat to the inner tube 11 and is then extracted through the exhaust conduit 81. No lifting elements are employed in the zone 37 to further minimize dust production.

The resulting dampened solid matter, which has been cooled to about 100° F. to 200° F., is ejected from the end of the tube 12 onto the conveyor belt assembly T by which it is removed, past the air lock 79, to a tailings disposal site (not illustrated).

Although not specifically illustrated, it will be understood that conventional instrumentation would be provided to control the following:

(1) Feed rate based on the temperature at the outlet of the outer heat exchange zone 36;

(2) Bitumen vapor removal rate adjusted to hold the pressure differential between the vapor zone and the combustion at zero;

(3) Primary air flow through the coolers 17, 18 and 20 to control condenser temperature;

(4) Burner 23 fuel flow to control burner exit air temperature;

(5) Total combustion air manually set or cascaded to feed rate;

(6) Position of the exhaust system damper 80a to maintain adequate system negative pressure;

(7) Cooling water addition to maintain exit sand tempeature;

(8) Continuous gas and vapor quality monitoring;

(9) Main rotary drive power draw and gross weight of the unit;

(10) Ablation zone 30 temperature and steam flow; and

(11) Vapor zone 33 and combustion zone 34 temperatures.

The operating sequences are so designed that a loss of feed will reduce all flows and continue to maintain an inert steam curtain by injection of water into the inner heat exchange zone 31 of the inner tube 11, if required. At the same time, the burner 23 maintains a high air temperature so that any vapor leakage would be burned immediately to prevent the development of an explosive atmosphere.

On shutdown, the unit 10 will continue to run as it does for loss of feed until all vapors are removed. At this time, the burner temperature is reduced and the cold air flow will continue until the unit 10 and recycle charge in the fixture 62 have been cooled to safe shutdown temperatures. During a short shutdown, the recycle sand is held in the vapor and combustion zones for ease of startup.

In the event of a major shutdown, several dump covers or other means (not illustrated) on the recycle compartments are manually opened allowing the trapped sand to be dumped. An alternative to this is blank plates (not illustrated) inserted over the recycle openings, thus allowing all sand to be discharged through the normal method.

An initial startup without sand is achieved by preheating the entire vapor zone and combustion zone with hot burner air to a temperature of 1100° F. to 1300° F. At this time, a steam purge of the central tube is carried out and continued as a low tonnage feed rate of tar sand is processed strictly by heat transfer through the inner tube walls of the vapor zone. All sand is held in the recycle system until it is replenished and the unit is run normally.

Since the hot bitumen vapors will burn in the presence of oxygen it is necessary to ensure adequate removal of vapor at all times. It is desirable to provide a second vapor extraction handling system (not illustrated) beyond the condenser 19 and run one system on emergency power in case of power failures or other emergencies that could shut down one system. Steam and water quench or venting to flares may also be required.

Since the inner tube area, lift and advancing elements are subjected to high temperature oxidation and corrosion, it is desirable to use special stainless steels or austenitic steels containing high nickel and chromium additives to provide creep strength and resistance to chemical attack. Parts can also be protected by use of inert refractory materials such as the lining 60 and coating 61 to cover exposed areas.

In a unit sized for handling 1500 tons of feed material per hour, the inner tube 11 has a diameter of approximately 22 feet and the outer tube has a diameter of approximately 31 feet. The length of the tubes is approximately 125 feet. The speed of rotation, temperature, pressures and other variables are set at values which are dependent upon the feed material and the desired processing rate. These size limitations are imposed by current material availability rather than any inherent feature or aspect of the process.

Typical retention times for material in the various zones in indicated in the following Table I.

TABLE I

| ZONE | RETENTION TIME |
| --- | --- |
| Ablation zone 30 | 2 minutes |
| Inner heat exchange zone 31 | 3-3½ minutes |
| Vapor and admixing zones 32 and 33 | 1½-2 minutes |
| Outer heat exchange zone recycle zones 35 and 36 | 7-9 minutes |
| Cooling and dampening zone 37 | 2 minutes |

FIG. 14 illustrates a modified form of the apparatus of the present invention indicated generally at 200. The apparatus 200 is similar in construction and operation to the apparatus 10 except for the direction of rotation of the tubes and the replacement of the auxiliary recycle fixture with a rapid recycle conduit 311 and an associated recycle fixture 312. Unless otherwise noted, the components in FIGS. 14 and 15 are identified by reference characters which are higher by 200 than the reference characters used to identify corresponding components in the illustrations of FIGS. 1–13. Cross flow of gases through the conduit 211 is controlled by controlling pressures within the apparatus.

The conduit 311 is secured to the outer surface of the outer tube 21 and functions to convey very hot recycle material just leaving the combustion zone directly to the inlet of the ablation zone 230. This recycle provision thus differs from the auxiliary recycle means of the apparatus 10 in that the hot recycle material in the apparatus 200 is fed into the inner tube without first passing through the outer heat exchange zone. As a result, the recycled material is substantially hotter so that a smaller amount of such material is required to raise the temperature of the incoming feed material.

In operation, part of the hot recycle sand leaving the end of the combustion zone falls through a screen 313 into the conduit 311. The conduit 311 advances helically along the outer tube 212. As the tube 212 rotates in the direction of the arrow 314, the sand moves through the conduit 311 to the recycle fixture 312. The conduit 311 completes a full turn about the tube 212 so that a charge of sand is added to the incoming feed material each full revolution of the tubes 211 and 212. The sand reaching the end of the conduit 311 is inserted into the inner tube 211 through a recycle tube 315. While only a single tube 315 is illustrated, it will be appreciated that one or more additional tubes, disposed along the helical path of the conduit 311, may be employed as required to provide the desired amount of hot recycle material to the feed end of the assembly 200. The tube 315 may be equipped with any suitable means for changing its discharge opening as required to permit adjustment of the rate of recycling. The screen 313 may also be dimensioned to control the amount of recycle material entering the conduit 311.

While the preferred forms of the apparatus and process of the invention have been described in detail, it will be appreciated that changes in sizes, configurations, materials of construction and general design of the apparatus, or changes in the steps of the process may be made without departing from the spirit of the invention.

DESCRIPTION OF PREFERRED EMBODIMENT OF MODIFIED VERSION OF INVENTION

The modified version of the apparatus which has been developed for treating heavy hydrocarbons will now be described.

The apparatus 10X comprises concentric radially spaced inner and outer tubes 11X, 12X. The two tubes are connected together in the manner previously described and are rotated about their common long axis. The ends of the inner tube terminate in end frames which rotate with the tube and seal its ends to contain generated gases, the recycle end frame 200X being merely a seal plate 200X while the product end frame 91X provides an inner to outer tube seal arrangement as well as functioning as the means for transferring solids from inner tube into the annular space between the tubes. A vapor discharge pipe 86X extends through the product end frame 91X into the inner tube 11X. The inlet and outlet ends of the outer tube 12X extend into stationary end assembly 14X and partially stationary end assembly 15X respectively. Roller mounted rings 45X, 46X are connected to the outer tube, as previously described, so that the tubes may be rotated by a motor 51X and ring gear 52X.

The tubes define or form a sequence of processing zones. More particularly, at its inlet end the inner tube 11X forms a mixing zone 32X wherein recycled hot solids are mixed to provide temperature equilibrium prior to contact with hydrocarbon-bearing liquid. Downstream of the mixing zone, the inner tube provides a vapor zone 33X wherein the liquid is deposited on the hot recycled solids and hydrocarbons are vaporized and cracked. The mixing and vapor zones together form an inner processing area which is a substantially open cylindrical space. A combustion zone 34X is provided in the open annular space formed between the tubes, wherein carbon-coated solids are burned to provide the required heat for the process. At the left hand end of the annular space, a recycle zone 35X is provided wherein are conducted screening, oversize particle rejection, undersize particle recycle and intermittent crushing of oversize particle operations. Finally, there is provided in the inlet end assembly 14X a cooling zone 36X, wherein oversize particles are cooled and discharged.

The tubes are initially charged with solids, for example coke or sand particles. These solids are advanced through the mixing, vapor and combustion zones 32X, 33X, 34X using advancing elements attached to the inner surfaces of the tubes, as previously described. More particularly, longitudinally extending rows of advancing elements 38X, 39X and 40X formed along the inner surface of the inner tube and similar advancing elements 43X, 44X formed along the inner surface of the outer tube cause the solids to move through the two tubes as they are rotated about their long axis. The number of elements as well as their size and degree of inclination may be varied to optimize the rate of advance through each zone.

Feed liquid containing heavy hydrocarbons is sprayed or deposited on the hot solids as they advance through the vapor zone 33X. Preferably, the feed liquid is pre-heated by heat exchange with the produced vapors in the coolers 17X, 18X. The pre-heated feed liquid may then be flashed in chamber 406X and produced gaseous light ends and water vapor returned to the condenser 19X. The pre-heated liquid is introduced into the vapor zone 33X through pipe 407X and sprayed on the moving solids through the nozzles 408X. The continuous mixing and cascading of the solids in the vapor zone ensures a uniform temperature of these particles so that hot and cold spots are minimized as the liquid is applied. Control of the rate of liquid application may be utilized to ensure rapid vaporizing of the hydrocarbons and close control of the contact time and hence the degree of cracking occurring in the vapor zone.

The ends of the inner tube are sealed to prevent the uncontrolled escape of the gases generated in the vapor zone 33X. At the recycle end, the plate 200X provides a closure which is penetrated only by the hot air pipe header 96Xa and the hot solids recycle pipes 66X. At the product end, an end assembly 91X provides a mechanical and moving solids seal against the escape of gases.

The carbon-coated particles are continuously transferred from the vapor zone 33X of the inner tube into the annular combustion zone 34X defined between the two tubes. In this connection, an end assembly 91X for accomplishing this is now described. Refer to FIGS. 102X and 113. The end assembly 91X is fastened to the product end of the inner tube 11X and is illustrated in FIG. 112X. The assembly is formed by two radial end plates 201X, 202X fastened together by a series of baffles 90X which form compartments. Carbon-coated particles are fed into these compartments through openings 95X located in the inner radial plate 201X. As the tubes rotate, the particles in the compartments move towards the central axis and, at a suitable angle, are discharged to the outer tube by way of a circular slot 92X located around rotating vapor discharge pipe segment 86Xa in the plane of the outer radial plate. The controlled discharging stream of solid particles forms a seal during the discharge period. The circular slot 92X is further sealed during the remaining 360 degrees of rotation by an adjustable stationary seal plate 93X. Adjusting mechanism 94X maintains the clearance between the stationary seal plate 93X and the rotating circular opening 92X. Mechanism 94X is hinged so that oversize or tramp material exiting through the seal openings 92X will momentarily move the seal plate away from its normal position allowing the oversize or tramp material to discharge into the outer tube 12X.

The outer tube 12X includes an inwardly projecting lip 15X. A stationary recycle end assembly 201X is provided to seal the recycle end of the outer tube. The assembly 201X comprises the ring element 202X and the ring seal 85X which cooperate to close off the aperture formed by the lip 15X. The vapor discharge pipe 86X is made up of an external stationary section 86Xb, securely fastened to the ring element 202X, and a rotating portion 86Xa which is fastened to and rotates with the assembly 91X. The stationary recycle end assembly 201X includes a rotary pipe seal 88X which seals around discharge pipe 86X.

Means are provided for supplying oxygen, as in the form of air, to the central portion of the combustion zone 34X. Such means may comprise a burner 23X, supplied with air by a fan 405X, which forces preheated air through the centre rotating pipe assembly 96X. The pipe assembly 96X is shown in FIGS. 102X and 111X and comprises stationary pipe 96Xb, rotating pipe header 96Xa and a number of radially extending pipes 96Xc terminating at injection nozzles 406X. The stationary pipe 96Xb and rotating pipe header 96Xa are connected by a suitable pipe seal 78X. High velocity combustion air exits from the nozzles 406X and creates turbulent conditions in the solid particle flows in the combustion zone. The combination of ejection velocity and the cascading of the solids in the combustion zone provide intimate mixing of the carbon-coated particles and oxygen, enabling rapid and complete combustion to take place.

The heated solid materials continue their travel toward the recycle or left hand of the apparatus where a screening element separates oversized material and recycle fixtures divert part or all of the undersize material back into the inner tube. More particularly, the screening and recycle fixture indicated generally at 62X, which may best be described by joint reference to FIGS. 102X and 110X, screens an oversize product and an undersize product on screen 67X. This screen has an opening size that is determined by the requirements of downstream coke users and by the recycle particle size requirements. A series of two or more recycle pipes 66X coupled to plates 65X, 67X, 64X and 63X and placed at approximately equal intervals along the inner tube 11X circumference, are used to lift and move recycled particles back into the inner tube while substantially retaining a solid particle seal between the inner and outer tube atmosphere. Undersize particles are collected in the area 64X between partial tubes 63X and 64X and move along this confined area until obstructed by plate 65X. The tapered recycle tube 66X contains the recycle until a degree of rotation is achieved so that the solid particles are discharged at a controlled rate into the inner tube 11X. The rate of material flow is adjustable by means of varying the outlet opening 69X by adjusting plate 68X.

The oversized fraction falls from the screen 67X into a coke processing and cooling system 404X.

A variable portion of the oversized particles may be crushed while still on the screen and recombined with the undersized fraction for recycling into the inner tube. More particularly, the end structure 14X comprises an impacting roller 403X for crushing oversized solids on the screen 67X.

The exhaust combustion gases from the area between the inner tube and outer tube flow through this annulus to the recycle end of the outer tube, then flow upwards along the stationary end frame where they combine with any steam produced from coke quenching. The combined exhaust gas flow exits to cyclones 401X for a coarse particle separation, through coolers 24X where sensible heat is recuperated, then scrubbed in a wet dust extractor 25X where the physical dust particles are removed. Sulphur dioxide ($SO_2$) in the exhaust gas stream is reacted with water and then with calcium (Ca) ions to produce calcium sulphate which is removed and disposed of as a waste sludge. The scrubbed sulphurless gas flow is expelled to a discharge stack by fan 26X.

Auxiliary burners 23X are used to preheat the unit for startup, maintaining temperature trim during operation, and for maintaining temperature during upset operating conditions. These burners can be located in the combustion air stream as illustrated or mounted for direct firing into the outer tube annulus at either the feed or discharge end of the apparatus.

The outer tube 12X is constructed of a metal shell having a substantially full lining 60X of refractory material. This lining is desirably constructed of an insulating refractory material which exhibits abrasion resistance and contains a coarse grog. The lining provides thermal insulation to prevent excessive process heat being lost through the outer shell as well as providing protection against abrasion and chemical attack.

In addition to advancing the solid particles through the inner tube 11X and outer tube 12X by means of the inclined elements 38X, 39X, 40X, 43X and 44X it is desirable in certain zones, to lift and drop the solid particles repeatedly. The outer tube surface is partially equipped with flat or cup plate lifters 100X as illustrated on FIG. 111X and FIG. 102X. Cup lifters have a greater lifting capacity and a larger area of discharge thus ensuring better contact between the falling solid particles and the combustion air molecules. The lifting mechanisms 100X are removably secured by balls, where possible, to the outer tube 12X.

The end closures 14X and 15X are suitably insulated with refractory to minimize heat losses from the process area and to protect metal surfaces from exposure to chemical attack and corrosion.

The rotating apparatus and stationary end frames are operated at near ambient pressure conditions and gas flows remain separated as a result of the combination of differential pressure control and rotating sand seals. An exhaust fan, exhaust gas scrubbing and cleaning system, as well as a cooling system with cyclones is provided for containment of the gases resulting from combustion of the carbon and any steam generated during final quenching of the excess coke particles. This exhaust system controls the flow of exhaust gases so that the entire length of the outer tube is maintained at a slight negative pressure with respect to ambient pressure outside the apparatus. This ensures a slight inflow of air which will be largely consumed in the combustion process and form part of the heat balance requirements. The hydrocarbon bearing vapors are continuously extracted from the product end of the inner tube by a series of fans, compressors, vapor cleaning equipment and condensors combined with coolers. These systems control the rate of vapor flow so that the pressure differential between the inner tube and the outer tube at the product end of the apparatus is maintained near zero.

Oxygen-bearing gases for the combustion process are injected into the solid particles being transported along the outer chamber through a series of non-plugging nozzles. These nozzles are located far enough away from the product end of the apparatus so that most of the oxygen is consumed by reaction with the coke, even under upset conditions where flow reversal might tend to move these gases towards the product end rather than the normal exit through the exhaust end of the apparatus.

The outer tube along with rotating and stationary end closures are suitably lined with refractory and insulation to prevent excess heat loss and exposure of the exterior structure to high temperature stresses. The inner and outer tube motion results in wearing of the contacting surfaces. The structure of the inner and outer contact surfaces, as well as the lifting and advancing elements is designed in easily handled units so that maintenance and replacement of worn components can be readily accomplished.

Operation of the Modified form of Apparatus

For the purpose of the description to follow, it is assumed that the feed liquid is a 15 to 18 API, asphaltic base crude oil that has approximately 4 percent by weight of water and solids entrained in it. Initially, the unit 10X is brought up to near operating temperature by using burner 23X which supplies hot air at approximately 1200° F. to the combustion zone. Steam is fed into the unit vapour chamber to purge out any remaining oxygen bearing gases. As the unit is being heated it is slowly rotated to ensure even heating of the complete rotating mass. When the temperature reaches approximately 900° to 1000° F. feed liquid is slowly applied into the vapour zone 33X. As the exterior handling equipment temperature stabilizes, the feed rate to the unit is increased and its rotating speed increased to the normal operating level. The rotation of the unit causes the solid particles to move through all zones of the unit as previously described.

During normal operation feed liquid containing hydrocarbons is fed through a combination of heat exchangers such as 18X and 17X which preheat the oil so that any liquids that do not require cracking can be flashed and vapourized. For typical heavy oil feeds this temperature is in the 600° to 700° F. range. The flash chamber 406X receives the preheated liquid feed and separates a vapour composed of steam and light hydro carbons which is fed directly to the primary vapour condensor 19X, and the remaining feed liquid is pumped or fed by gravity to pipe 407X. Pipe 407X is suspended in the area of the inner and outer tube rotating axis but is coupled to stationary vapour discharge pipe 86Xb such that it does not rotate with the tubes. Sprays 408X mounted at certain intervals along the bottom of pipe 407X control the location and coverage of the liquid application to the surface of the moving solid particles so that a smooth continuous rate of cracking reactions take place. The rotation of the inner tube 11X co-operates with the advancing elements 38X, 39X and 40X and variable lifting elements 56X so that the solid particles are continuously being gently mixed and moved under the sprays 408X thus ensuring an even temperature amongst the solid particles and a uniform rate of carbon build-up on the solid particles. The temperature of the recycle particles for a 15 to 18 API crude should be in the range of 1000° to 1200° F. as the particles enter zone 32X and not below 850° F. when the particles exit the inner tube after passing through the spray zone 33X. Spray pipe 407X can be rotated by an external mechanism up to 90 degrees from vertical in either a clockwise or anti clockwise direction so that the sprays can be properly directed onto the solid particles and partially onto the inner tube 11X if this is desirable for the process. The solid particles, cooled during their reacting period under the liquid sprays 408X, continue being moved by advancing elements 40X towards the discharge seal end assembly 91X. The solid particles enter the seal assembly through openings 95X and are elevated by contact with plate 90X and the rotation of the apparatus until they are discharged to the outer tube 12X by gravity through slot 92X.

The feed liquid upon contact with the recycled, hot, solid particles cracks to form hydro carbon vapours which fill the internal area formed by inner tube 11X and the end closures of tube 11X. Vapour flow control fan 400X applies a slight suction to cyclones 16X, vapour pipe 86X and inner tube zone 32X and 33X. As vapours are produced they flow through discharge pipe 86X, then through cyclones 16X where coarse solids are removed. Vapour fan 400X may serve as a second dust extractor by recycling condenser heavy liquid products through the fan so that the liquid droplets may contact the fine particles and absorb them. The vapour fan discharges the hydro carbon vapour into a condenser 19X where the vapours are cooled and condensed by contact with packed trays and liquid sprays. The combined condensed lqiuids are fed through suitable heat exchangers 17X and 18X then a portion of that liquid is recycled to the condenser for cooling of further incoming vapours. A relatively small portion of the vapour stream contains hydro carbons that remain as gases at temperatures of 100° to 200° F. and these are further cooled in cooler 20X, pumped to storage by compressor 21X and further cooled by cooler 22X if so required. The vapour temperature exiting pipe 86X is in the order of 700° to 900° F. while the final temperature of the exiting liquid and gas products will be close to ambient temperatures.

Once the solid particles, with their deposits of reaction carbon, are discharged from seal end assembly 91X they contact the surface arrangement of outer tube 12X. The combination of drum rotation and inclined advancing elements 43X moves these particles back into the combustion zone. Lifters 100X act to lift those particles and drop them through the atmosphere of combustion gases so that oxygen present in the gas can efficiently react with the surface carbon. This reaction produces heat which is absorbed by the particles thereby increasing its temperature. Sufficient combustion gas is added so that the particles temperature increases from approximately 900° F. to the range of 1000° F. to 1300° F.

Combustion air is supplied at a pressure of 5 to 15 inches water gauge and is passed through a combination of heat exchangers 404X and 23X such that the gas is heated to more than 500° F. This preheated combustion air flows through pipes 96Xa, 96Xb and 96Xc and exits through a series of high velocity nozzles 406X that ensure turbulent mixing of gas molecules and carbonized particles. Any oxygen not consumed in this initial contact at the nozzles is available to react with carbon throughout zones 34X and 35X as a combination of lifters 101X which extend throughout zone 35X repeatedly lifts and drops the solid particles through the gas atmosphere.

The solid particles are progressively moved towards the recycle and screening assembly 62X during the combustion process. Upon arriving at this assembly, they are fed onto the screen segments 67X where oversize is handled as previously described. The undersize particles, along with crushed fine particles as required, are collected in the segmented annulus under the screen and, as the apparatus 10X rotates, the particles enter openings 64X and continue moving down the annulus until they contact plate 65X. As the apparatus continues to rotate the particles are lifted by plate 65X until an angle is reached where the particles start to discharge into the inner tube 11X through tube 66X, opening 68X and discharge rate adjustment 69X. Once these particles are deposited in the inner tube they are progressively moved and mixed in zone 32X by the arrangement of inclined elements 38X and the configuration of the inner tube sections 56X. The solid particles move under the feed applicators sprays and the cracking reaction and cycle is repeated.

The exhaust gases from the combustion zone, any air leakage through the rotating seals, as well as any steam resulting from coke quenching, is removed continuously from the units by suction from the exhaust system. Exhaust gases pass through the stationary end frame 14X, pass up through discharge pipe and control dampers 80X and 81X, pass through coarse particle removal cyclones 401X, pass through cooling heat exchangers 24X then are scrubbed for removal of fine particulates and noxious gases prior to injection to atmosphere by a suitably designed stack system.

Figure 101X:
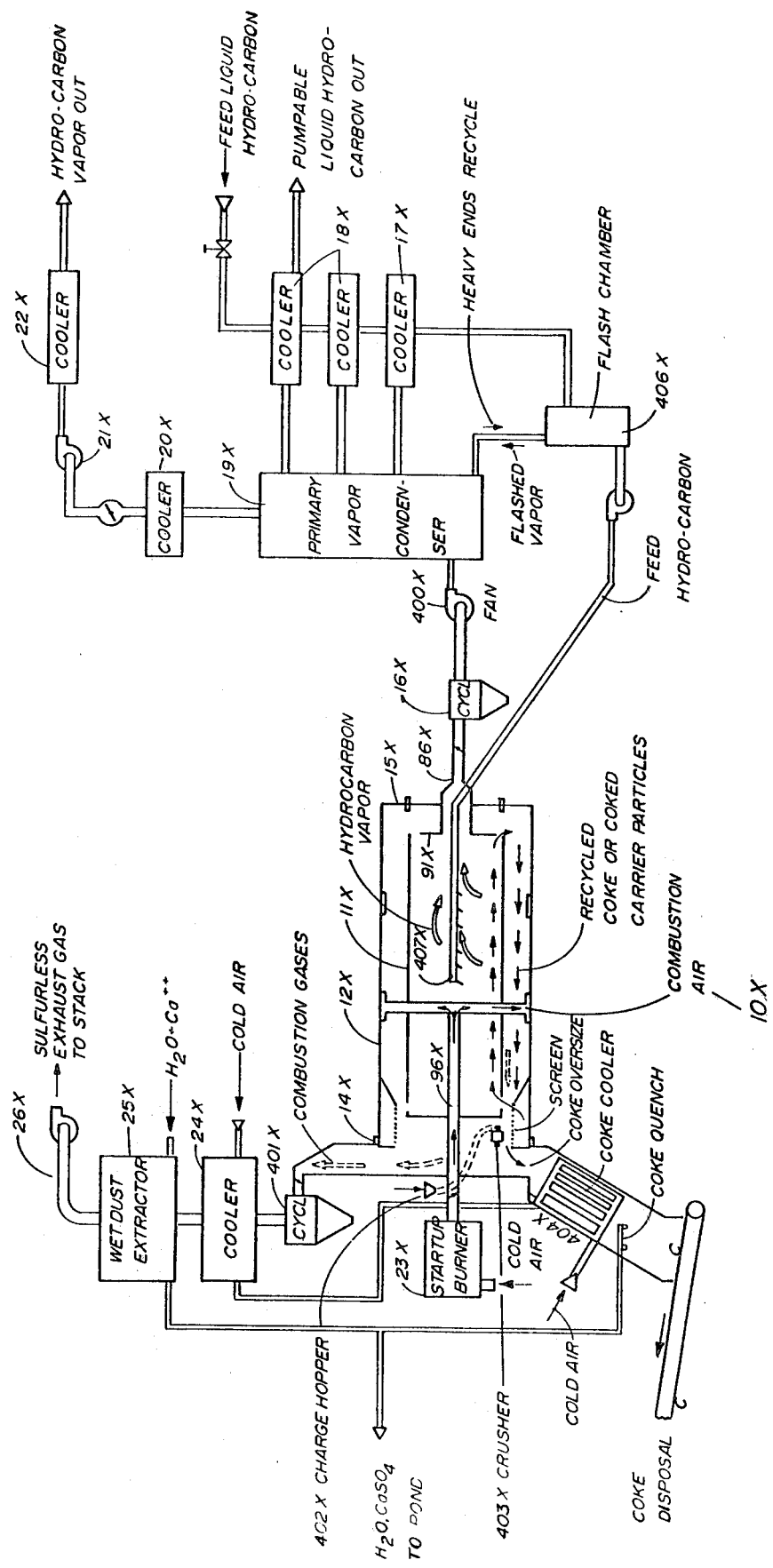
FIG. 101X is a schematic diagram illustrating the process and apparatus of the modified form of the present invention and one possible arrangement of external equipment for simple condensing of the hydrocarbon vapors to provide a pumpable liquid and a cooled coke by-product that can be used as a feed for boilers or furnaces for production of heat energy.

The exhaust system rate of discharge is controlled by a suitable damper arrangement such that the rotating apparatus is kept under a very slight negative pressure. It will also be appreciated that the pressures required for proper operation are dependent on the type and character of the feed and recyclye materials so that internal pressure relationships may be altered to obtain the desired gas flows through apparatus 10X. Thus, while subatmospheric pressures are considered preferable in the vapour release and combustion zones, super atmospheric pressures may be desirable under certain feed and recycle conditions. In the preferred form of the invention the pressures in the vapour release zone 33X and the combustion zones 34X are maintained substantially equal to minimize any cross flow of process gases between the two tubes. These pressures are maintained by proper positioning of the damper 80Xa and by proper positioning of dampers and other control means, indicated generally in FIG. 101X on the vapour compressor 21 and the fans supplying the combustion air and the various cooler air flows. By these means, hydro carbon vapours in zone 33X and the combustion gases in zone 34X are prevented from flowing through slots 92X or openings 64X and work in co-operation with their respective sand and mechanical seal arrangements to maintain a separation between the gases.

Although not specifically illustrated, it will be understood that conventional instrumentation will be provided to control the following:

1. Liquid feed rate based on temperature profile and capacity of the hydro carbon vapour condensing and cleaning systems.
2. Hydro carbon vapour removal rate adjusted to hold the pressure differential between the vapour zone and the combustion zone at zero.
3. Primary combustion air flow through coolers and burners to maintain the correct quantity of oxygen for the required carbon combustion to provide the process heat requirements.
4. Burner fuel flow as required to maintain correct temperature profiles.
5. Exhaust system damper control to maintain adequate system negative pressure.
6. Cooling water and air flows to maintain temperatures of exiting products such as coke, pumpable liquid hydro carbon, crack gas and exhaust gases.
7. Control of quantity of crushed and recycled oversize solid particles necessary to maintain an adequate quantity of solids in the rotating unit.
8. Control of temperature profile of the feed liquid passing through the condenser coolers so that proper flashing of low boiling point liquids occur prior to feeding into the rotating unit.
9. Control of coke cooling and quenching systems to ensure proper coke exit temperatures.
10. Main rotary drive power draw and gross weight of the rotating assembly.
11. Continuous monitoring of gas and vapour quality.

The operating sequences are so designed that a loss or reduction in feed will reduce all flows automatically and maintain a proper pressure balance, as well as the proper temperature profiles.

On shut-down, the unit continues to run until all feed liquid in the system has been processed then the rotating unit is stopped. The atmosphere inside the inner and outer tubes is purged by use of steam or a suitable inert gas such as nitrogen in order to prevent any air containing oxygen from entering the system.

In the event of an uncontrolled emergency shut-down, suitable vents and by-passes are opened to prevent internal process gases pressurizing the unit and leaking outward through the rotating seals between outer tube 12X and the stationary end frames. Steam and water quench as well as inert gas addition may also be required to maintain a safe atmosphere in and around the apparatus.

Since the inner tube area, outer tube area, lift and advance elements as well as the recycle arrangement and the inner tube product end seal are subject to high temperature stresses, corrosion, and erosion, it is desirable to use specific alloy steels, stainless steels or austenitic steels containing nickel and chromium additives to provide creep strength and resistance to chemical attach. Parts can also be protected by proper use of resistant refractory coatings.

In a unit sized for processing 5000 barrels per day of a 15 to 18 API oil containing 2 to 5 percent by weight of water and sediments, the inner tube has a diameter of approximately 12 feet and a length of approximately 26 feet while the outer tube has a diameter of approximately 17 feet and a length of approximately 30 feet. The speed of rotation, temperatures, pressures, and other variables are set at values which are dependent upon the type and origin of the feed liquid and the quantity of various final products required.

Typical retention times and temperatures for material in the various zones are as indicated in the following Table I.

TABLE I

| | Zone | Retention Time | Temperature Range |
|---|---|---|---|
| 1. | Mixing Zone 32X | 10 sec. to 1 minute | 1000°–1400° F. |
| 2. | Reaction Zone 33X | 20 sec. to 3 minutes | 1000°–1400° F. to 850° F. |
| 3. | Combustion Zone 34X | 1 minute to 10 minutes | 850° F. to 100°–1400° F. |
| 4. | Recycle area 35X | 10 sec. to 2 minutes | 1000°–1400° F. |
| 5. | Coke cooling 36X | 1 minute to 5 minutes | 1000°–1400° F. to 130° F. |
| 6. | Vapour cooling | 2 sec. to | 850° F. to 100°–150° F. |

TABLE I-continued

| Zone | Retention Time | Temperature Range |
|---|---|---|
| condensing | 2 minutes | |
| 7. Exhaust handling | 0.5 sec. to 10 secs. | 1000°–1400° F. to 100°–200° F. |

In certain cases the cooler - condenser is designed so that the high boiling point bottoms from the condenser are recycled back to the apparatus and cracked to extention.

A five foot diameter test unit has been operated as a cracking unit using a Lloydminster Wellhead Crude and Bitumen as present in the oil sands located in the northeastern area of Alberta, Canada. The results from these particular feed samples are as follows. Condenser bottoms were not recycled so these results represent a 1 pass system operation.

| Item | Lloydminster Wellhead Crude Feed | Product |
|---|---|---|
| API | 16.0 | 23.3 |
| Viscosity at 77° F. | 1348 c.s. | 6.3 c.s. |
| Sulphur | 3.9% | 3.2% |
| Pour Point | +20° F. | less than 50° F. |
| Vacuum Distillation - Liquid | 47% | 86% |
| Vacuum Distillation - Residue | 53% | 14% |
| Coke Produced | — | 11% |
| Crack gas produced | — | 5% |
| Reaction Temperature | — | approx. 900° F. |

| Item | Athabasca Oil Sands Bitumen Feed | Product |
|---|---|---|
| API | 8.8 | 17.0 |
| Viscosity at 150° F. | 1800 c.p. | 120° F. 6 c.p. |
| Sulphur | 4.3 | 3.9 |
| Pour Point | +70° F. | less than 50° F. |
| Vacuum Distillation - LIquid | 11% | 94% |
| Vacuum Distillation - Residue | 89% | 6% |
| Coke Produced | — | 18% |
| Crack Gas Produced | — | 5% |
| Reaction Temperature | — | approx. 900° F. |

While the preferred forms of the apparatus and process of the invention have been described in detail, it will be appreciated that changes in size, configurations, materials of construction and general design of the apparatus, or changes in the steps of the process may be made without departing from the spirit of the invention.

The embodiments of the invention in which an exclusive property or privilege is claimed are defined as follows:

1. A process for upgrading heavy hydrocarbons, such process employing direct thermal treatment effected in an apparatus having horizontal, concentric, radially spaced inner and outer rotatable tubes in which one axial end is the feed end and the opposite axial end is the product end, said inner tube forming an open cylindrical vapor zone, said tubes forming between them an open annular space having a combustion zone, comprising:

continuously advancing hot particulate solids through the inner tube from the feed end to the product end and back through the annular space;

spraying the hydrocarbons as a liquid into the vapor zone onto the hot solids;

cascading and mixing the solids and hydrocarbons as they advance through the vapor zone to achieve beneficial heat transfer and thereby vaporize hydrocarbons and form carbon on the solids;

removing by suction the hydrocarbon vapors produced in the inner tube;

transferring carbon-coated solids from the product end of the inner tube into the combustion zone in the annular space;

cascading and repeatedly raising and dropping the carbon-coated solids in the combustion zone while introducing oxygen-containing gas thereinto to burn at least part of the carbon and heat the remainder of the solids;

transferring burned hot solids from the feed end of the annular space into the feed end of the inner tube;

removing by suction vapors produced in the combustion zone; and maintaining seals against gaseous flow between the combustion zone and the vapor zone by a combination of maintaining substantially equal pressures in said zones and blocking gaseous flow with the solids being transferred.

* * * * *